(12) United States Patent
Uchida

(10) Patent No.: US 6,877,311 B2
(45) Date of Patent: Apr. 12, 2005

(54) CATALYST DEGRADATION DETERMINING APPARATUS AND METHOD

(75) Inventor: Takahiro Uchida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/601,243

(22) Filed: Jun. 23, 2003

(65) Prior Publication Data

US 2004/0000135 A1 Jan. 1, 2004

(30) Foreign Application Priority Data

Jun. 27, 2002 (JP) ........................................ 2002-188287

(51) Int. Cl.[7] .................................................. F01N 3/00
(52) U.S. Cl. ............................ 60/277; 60/274; 60/276; 60/285
(58) Field of Search ........................... 60/274, 276, 277, 60/285

(56) References Cited

U.S. PATENT DOCUMENTS

| | | | | |
|---|---|---|---|---|
| 5,414,996 A | | 5/1995 | Sawada et al. | |
| 5,678,402 A | * | 10/1997 | Kitagawa et al. | 60/276 |
| 5,732,551 A | * | 3/1998 | Naber et al. | 60/274 |
| 5,848,528 A | * | 12/1998 | Liu | 60/274 |
| 5,966,930 A | * | 10/1999 | Hatano et al. | 60/276 |
| 6,289,673 B1 | * | 9/2001 | Tayama et al. | 60/285 |
| 6,622,479 B2 | * | 9/2003 | Kakuyama et al. | 60/285 |
| 6,694,243 B2 | * | 2/2004 | Shi et al. | 701/114 |

FOREIGN PATENT DOCUMENTS

| | | |
|---|---|---|
| JP | 5-248227 | 9/1993 |
| JP | 2001-329832 | 11/2001 |

* cited by examiner

*Primary Examiner*—Binh Q. Tran
(74) *Attorney, Agent, or Firm*—Oliff & Berridge, PLC

(57) ABSTRACT

A catalyst degradation determining apparatus determines whether a catalyst provided in an exhaust passage of an internal combustion engine has degraded. The apparatus includes a controller. The controller acquires a degradation index value that changes in accordance with a degree of degradation of the catalyst. The controller corrects the degradation index value acquired, based on a factor that affects the degradation index value, so that the degradation index value becomes equal to a post-normalization index value that is a degradation index value acquired when the factor is a predetermined value. The controller also determines whether the catalyst has degraded, based on a result of comparison regarding whether the post-normalization index value is greater than a catalyst degradation criterion value.

12 Claims, 22 Drawing Sheets

CATALYST DEGRADATION DETERMINING APPARATUS AND METHOD

INCORPORATION BY REFERENCE

The disclosure of Japanese Patent Application No. 2002-188287 filed on Jun. 27, 2002, including the specification, drawings and abstract is incorporated herein by reference in its entirety.

BACKGROUND OF THE INVENTION

1. Field of Invention

The invention relates to catalyst degradation determining apparatus and method for determining whether a catalyst disposed in an exhaust passage of an internal combustion engine has degraded.

2. Description of Related Art

A known three-way catalyst (sometimes referred to simply as "catalyst" in this specification) for controlling exhaust gas from an internal combustion engine is disposed in an exhaust passage of the internal combustion engine. The three-way catalyst has an $O_2$ storage function ($O_2$ absorbing function). If the air-fuel ratio of gas that flows into the catalyst is rich of stoichiometry, the catalyst causes oxidation of unburned components, such as HC, CO, etc., by oxygen stored in the catalyst. If the air-fuel ratio of inflowing gas is lean of stoichiometry, the catalyst causes reduction of nitrogen oxides (NOx), and stores oxygen detached from NOx. Therefore, the three-way catalyst is able to efficiently remove unburned components and nitrogen oxides even if the engine air-fuel ratio deviates from a stoichiometric air-fuel ratio. Hence, the emissions control capability of the three-way catalyst increases with increases in the maximum value of the amount of oxygen storable in the three-way catalyst. Hereinafter, the amount of oxygen storable in the three-way catalyst will be referred to as "oxygen storage amount", and the maximum value thereof will be referred to as "maximum oxygen storage amount".

The catalyst degrades due to heat given to the catalyst or the poisoning by lead, sulfur and the like contained in fuel. It is known that as the degradation of the catalyst due to the poisoning progresses, the maximum oxygen storage amount decreases, and that as the degradation thereof due to heat progresses, the efficiency of removal of harmful exhaust components at a given air-fuel ratio decreases. It is also known that there is a strong correlation between the degree of progress of catalyst degradation due to the poisoning and the degree of catalyst degradation due to heat. Therefore, as indicated in FIG. 25, if a maximum oxygen storage amount Cmax of the catalyst is calculated or acquired, it becomes possible to determine whether the catalyst has degraded on the basis of the acquired maximum oxygen storage amount Cmax. That is, the maximum oxygen storage amount Cmax is a degradation index value that changes with the degree of degradation of the catalyst.

A catalyst degradation degree detecting apparatus disclosed in Japanese Patent Application Laid-Open Publication No. 5-133264 detects the degree of catalyst degradation on the basis of the aforementioned finding, in the following manner. The apparatus switches the air-fuel ratio of gas upstream of a catalyst to a predetermined air-fuel ratio that is on the lean side of the stoichiometric air-fuel ratio or to a predetermined air-fuel ratio that is on the rich side of the stoichiometric air-fuel ratio. After that, the apparatus determines an amount of catalyst-passing gas that passes through the catalyst during a period from the switching of the air-fuel ratio until the air-fuel ratio detected by an air-fuel ratio sensor disposed in an exhaust passage downstream of the catalyst reaches the aforementioned post-switch predetermined air-fuel ratio. The apparatus further calculates an absolute amount of oxygen adsorbed and retained by the catalyst (i.e., a maximum oxygen storage amount Cmax) from the amount of catalyst-passing gas and the deviation of the post-switch predetermined air-fuel ratio from the stoichiometric air-fuel ratio, and detects the degree of catalyst degradation from the absolute amount of oxygen.

However, as indicated in FIG. 26, the maximum oxygen storage amount Cmax also changes depending on factors that affect the maximum oxygen storage amount, such as the catalyst temperature Tempc, and the like. Therefore, if it is determined whether the catalyst has degraded on the basis of, for example, a result of determination as to whether the maximum oxygen storage amount Cmax acquired without factoring in the catalyst temperature Tempc is greater than a catalyst degradation criterion value, a problem of unfavorable precision in determination arises.

SUMMARY OF THE INVENTION

The invention has been accomplished in view of the aforementioned problems and provides catalyst degradation determining apparatus and method for determining whether a catalyst provided in an exhaust passage of an internal combustion engine has degraded. A catalyst degradation determining apparatus according to a first aspect of the invention includes a controller which; acquires a degradation index value that changes in accordance with a degree of degradation of the catalyst; corrects the degradation index value acquired based on a factor that affects the degradation index value so that the degradation index value becomes equal to a post-normalization index value that is a degradation index value acquired when the factor is a predetermined value; and determines whether the catalyst has degraded, based on a result of comparison regarding whether the post-normalization index value is greater than a catalyst degradation criterion value.

Therefore, the degradation index value that changes in accordance with the degree of degradation of the catalyst is acquired by the controller. The degradation index value is, for example, the maximum oxygen storage amount of the catalyst, a ratio (locus ratio) between the length of a locus formed by the output of a downstream-side air-fuel ratio sensor disposed downstream of the catalyst and the length of a locus formed by the output of an upstream-side air-fuel ratio sensor disposed upstream of the catalyst during a period during which the air-fuel ratio of gas flowing into the catalyst is feedback-controlled to the stoichiometric air-fuel ratio, or the like, but is not limited to these values.

The degradation index value of the catalyst is corrected on the basis of a "factor that affects the degradation index value", for example, the temperature of the catalyst at the time of determination of the degradation index value, the air-fuel ratio of gas that flows into the catalyst at the time of determination of the degradation index value, etc. As a result, a degradation index value acquired when the factor is a predetermined value, that is, a "post-normalization index value", is determined. On the basis of a result of determination as to whether the post-normalization index value is greater than the catalyst degradation criterion value, it is determined whether the catalyst has degraded.

Therefore, a given degree of degradation of the catalyst always provides a certain post-normalization index value despite variations of the value of the factor at the time of acquisition of a degradation index value. On the basis of comparison of the post-normalization index value with the catalyst degradation criterion value, it is determined whether the catalyst has degraded. Therefore, it becomes possible to avoid a false determination as to whether the catalyst has degraded, due to an influence of the factor. Furthermore, since the degradation index value acquired when the factor is greatly different from the predetermined value can also be used for determination regarding catalyst degradation based on comparison with the catalyst degradation criterion value, the frequency of determination regarding catalyst degradation can be increased.

A catalyst degradation determining apparatus according to a second aspect of the invention includes a controller and a data storage. The controller calculates a maximum oxygen storage amount of the catalyst, and acquires a calculation period catalyst temperature that is a temperature of the catalyst during a period during which the maximum oxygen storage amount is calculated. The data storage pre-stores relationships between the temperature of the catalyst and the maximum oxygen storage amount of the catalyst separately for individual degrees of degradation of the catalyst, and pre-stores a characteristic value that specifies the degrees of degradation corresponding to the relationships. If a maximum oxygen storage amount is calculated and the calculation period catalyst temperature during the period of calculation of the maximum oxygen storage amount is within a predetermined temperature range, the controller determines the characteristic value of the catalyst occurring at a time point of calculation of the maximum oxygen storage amount based on the maximum oxygen storage amount and the calculation period catalyst temperature as well as the relationships and the characteristic value stored in the data storage. If a maximum oxygen storage amount is newly calculated and the calculation period catalyst temperature during the period of calculation of the maximum oxygen storage amount newly calculated is not within the predetermined temperature range, the controller corrects the newly calculated maximum oxygen storage amount through normalization so as to reach a post-normalization maximum oxygen storage amount that is a maximum oxygen storage amount when the catalyst has a predetermined normalization temperature, based on the characteristic value determined, the normalization temperature, and the calculation period catalyst temperature of the calculation period of the newly calculated maximum oxygen storage amount. Further, the controller determines whether the correction of the newly calculated maximum oxygen storage amount is appropriate. Then, the controller determines whether the catalyst has degraded based on a result of determination as to whether the post-normalization maximum oxygen storage amount is greater than a catalyst degradation criterion value, when it is that the correction of the newly calculated maximum oxygen storage amount is appropriate.

Therefore, a maximum oxygen storage amount is calculated, and the temperature of the catalyst during the period of calculation of the maximum oxygen storage amount (i.e., calculation period catalyst temperature) is acquired. In the data storage, relationships between the temperature of the catalyst and the maximum oxygen storage amount of the catalyst are pre-stored separately for individual degrees of degradation of the catalyst, and a characteristic value that specifies the degrees of degradation is pre-stored corresponding to the relationships.

If a maximum oxygen storage amount is calculated and the calculation period catalyst temperature during the period of calculation of the maximum oxygen storage amount is within a predetermined temperature range, the characteristic value of the catalyst at the time point of calculation of the maximum oxygen storage amount is determined based on the maximum oxygen storage amount and the calculation period catalyst temperature as well as the relationships and the characteristic values stored in the data storage.

If a maximum oxygen storage amount is newly calculated and the calculation period catalyst temperature during the period of calculation of the newly calculated maximum oxygen storage amount is not within the predetermined temperature range, the newly calculated maximum oxygen storage amount is corrected on the basis of the determined characteristic value, a predetermined normalization temperature, and the calculation period catalyst temperature during the period of calculation of the newly calculated maximum oxygen storage amount, and is converted into the post-normalization maximum oxygen storage amount that is a maximum oxygen storage amount provided when the catalyst has a predetermined normalization temperature. At the same time, it is determined whether the correction (conversion) to the post-normalization maximum oxygen storage amount is appropriate.

If it is determined that the correction is appropriate, determination regarding degradation of the catalyst is made on the basis of a result of determination as to whether the post-normalization maximum oxygen storage amount is greater than the catalyst degradation criterion value.

Thus, a maximum oxygen storage amount calculated when the temperature of the catalyst is different from the normalization temperature is converted into the post-normalization maximum oxygen storage amount that is equal to the maximum oxygen storage amount calculated at the normalization temperature. Determination regarding catalyst degradation is performed on the basis of a result of comparison of the post-normalization maximum oxygen storage amount with the catalyst degradation criterion value that is set between the maximum oxygen storage amount that can be assumed at the normalization temperature by the catalyst that should be determined as a degraded catalyst and the maximum oxygen storage amount that can be assumed by the catalyst that should be determined as an un-degraded catalyst. Therefore, the precision in determination regarding catalyst degradation can be enhanced regardless of the catalyst temperature occurring at the time of calculation of the maximum oxygen storage amount.

Furthermore, it is determined whether the correction performed for acquisition of a post-normalization maximum oxygen storage amount is appropriate, that is, whether the characteristic value is appropriate with respect to the present state of the catalyst. If it is determined that the correction is appropriate, determination regarding catalyst degradation is performed on the basis of the post-normalization maximum oxygen storage amount. Therefore, it is possible to avoid an event where it is determined that a catalyst has not degraded although it should actually be determined that the catalyst has degraded, as in the case where the characteristic value is not updated despite progress of the degradation of the catalyst and therefore the post-normalization maximum oxygen storage amount becomes excessively great relative to the true maximum oxygen storage amount at the normalization temperature.

Even if a maximum oxygen storage amount is acquired outside the predetermined temperature range, the determination regarding catalyst degradation based on the post-normalization maximum oxygen storage amount is performed as long as it is determined that the correction is appropriate. Therefore, even in that case, it is possible to newly obtain a result of determination that the catalyst has not degraded. Thus, the frequency of determination regarding catalyst degradation can be increased in comparison with the case where determination regarding catalyst degradation is performed only on the basis of the maximum oxygen storage amount acquired within the predetermined temperature range.

In this case, it is preferable that the predetermined temperature range be set as a range in which the maximum oxygen storage amount of the catalyst when the catalyst is to be determined as a degraded catalyst is always different from the maximum oxygen storage amount of the catalyst when the catalyst is to be determined as an un-degraded catalyst even if the maximum oxygen storage amount of the catalyst calculated within the temperature range varies due to a measurement error, and that the normalization temperature be set at a temperature within the predetermined temperature range.

Therefore, different degrees of catalyst degradation always provide different values of the maximum oxygen storage amount even if there occurs a measurement error in the maximum oxygen storage amount. Hence, the characteristic value determined on the basis of the maximum oxygen storage amount reliably corresponds to the degree of degradation of the catalyst. Furthermore, an event where the post-normalization maximum oxygen storage amount of a degraded catalyst is equal to the post-normalization maximum oxygen storage amount of an un-degraded catalyst is avoided. Therefore, the precision in determination regarding catalyst degradation can be further increased.

The relationship between the temperature and the maximum oxygen storage amount of the catalyst can be approached with good precision by a linear expression (straight line) regardless of the degree of degradation of the catalyst. Therefore, the characteristic value stored by the data storage may be a gradient of a straight line defined by a linear expression of a relationship between the temperature of the catalyst and the maximum oxygen storage amount of the catalyst.

In this case, it is preferable that the controller be designed so as to; determine a correction amount by multiplying a difference between the calculation period catalyst temperature during the period of calculation of the newly calculated maximum oxygen storage amount and the normalization temperature by the gradient of the linear expression that is the determined characteristic value, and determine the post-normalization maximum oxygen storage amount by correcting the newly calculated maximum oxygen storage amount with the correction amount; and determine whether the correction is appropriate based on a ratio of the correction amount to the newly calculated maximum oxygen storage amount used in determining the post-normalization maximum oxygen storage amount, or a ratio of the determined gradient to the newly calculated maximum oxygen storage amount.

Thus, the relationship between the maximum oxygen storage amount and the calculation period catalyst temperature is approached by a linear expression, and a correction amount for normalization is determined in accordance with the approach or approximation, and a post-normalization maximum oxygen storage amount is determined on the basis of the determined correction amount. Through these simple operations, the post-normalization maximum oxygen storage amount can be determined. Furthermore, it has been empirically confirmed that the ratio of the correction amount to the newly calculated maximum oxygen storage amount used in determining the post-normalization maximum oxygen storage amount, and the ratio of the determined gradient to the newly calculated maximum oxygen storage amount do not exceed a predetermined value as long as the correction is appropriate. Therefore, it is possible to easily determine whether the correction is appropriate using either one of the ratios.

A third aspect of the invention is a catalyst degradation determining method for determining whether a catalyst provided in an exhaust passage of an internal combustion engine has degraded. In this method, a degradation index value that changes in accordance with a degree of degradation of the catalyst is acquired; the degradation index value acquired based on a factor that affects the degradation index value is corrected so that the degradation index value becomes equal to a post-normalization index value that is a degradation index value acquired when the factor is a predetermined value; and whether the catalyst has degraded is determined based on a result of comparison regarding whether the post-normalization index value is greater than a catalyst degradation criterion value.

The degradation index value is, for example, the maximum oxygen storage amount of the catalyst, a ratio (locus ratio) between the length of a locus formed by the output of a downstream-side air-fuel ratio sensor disposed downstream of the catalyst and the length of a locus formed by the output of an upstream-side air-fuel ratio sensor disposed upstream of the catalyst during a period during which the air-fuel ratio of gas flowing into the catalyst is feedback-controlled to the stoichiometric air-fuel ratio, or the like, but is not limited to these values.

The degradation index value of the catalyst is corrected on the basis of a "factor that affects the degradation index value", for example, the temperature of the catalyst at the time of determination of the degradation index value, the air-fuel ratio of gas that flows into the catalyst at the time of determination of the degradation index value, etc. As a result, a degradation index value acquired when the factor is a predetermined value, that is, a "post-normalization index value", is determined. On the basis of a result of determination as to whether the post-normalization index value is greater than the catalyst degradation criterion value, it is determined whether the catalyst has degraded.

A fourth aspect of the invention is another catalyst degradation determining method. In this method, a maximum oxygen storage amount of the catalyst is calculated; a calculation period catalyst temperature that is a temperature of the catalyst during a period during which the maximum oxygen storage amount is calculated is calculated; relationships between the temperature of the catalyst and the maximum oxygen storage amount of the catalyst are pre-stored separately for individual degrees of degradation of the catalyst, and a characteristic value that specifies the degrees of degradation corresponding to the relationships is pre-stored. Furthermore, if a maximum oxygen storage amount is calculated and the calculation period catalyst temperature during the period of calculation of the maximum oxygen storage amount is within a predetermined temperature range, the characteristic value of the catalyst occurring at a time point of calculation of the maximum oxygen storage amount is determined based on the maximum oxygen storage amount and the calculation period catalyst temperature as well as the stored relationships and characteristic value. If a maximum oxygen storage amount is newly calculated and the calculation period catalyst temperature during the period of calculation of the maximum oxygen storage amount newly calculated is not within the predetermined temperature range, the newly calculated maximum oxygen storage amount is corrected through normalization so as to reach a post-normalization maximum oxygen storage amount that is a maximum oxygen storage amount when the catalyst has a predetermined normalization temperature, based on the characteristic value determined, the normalization temperature, and the calculation period catalyst temperature of the calculation period of the newly calculated maximum oxygen storage amount. Then, it is determined whether the correction of the newly calculated maximum oxygen storage amount is appropriate, and it is determined whether the catalyst has degraded based on a result of determination as to whether the post-normalization maximum oxygen storage amount is greater than a catalyst degradation criterion value, when it is that the correction of the newly calculated maximum oxygen storage amount is appropriate.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
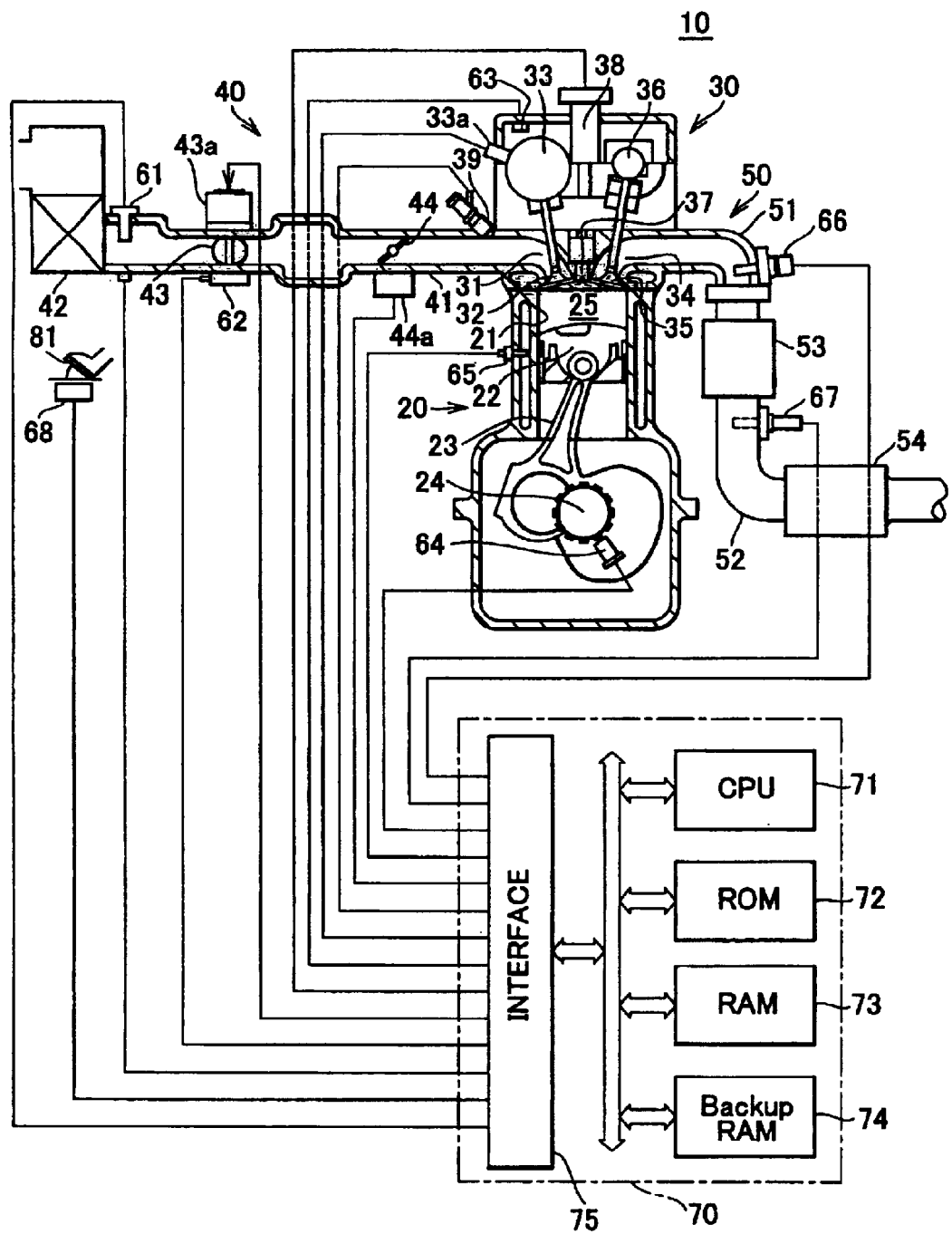
FIG. 1 is a schematic illustration of an internal combustion engine to which an air-fuel ratio control apparatus (catalyst degradation determining apparatus) in accordance with an embodiment of the invention is applied.

Embodiments of an internal combustion engine air-fuel ratio control apparatus that includes a catalyst degradation determining apparatus in accordance with the invention will be described in detail hereinafter with reference to the accompanying drawings. FIG. 1 schematically illustrates the construction of a system in which the air-fuel ratio control apparatus is applied to a spark ignition type multi-cylinder (four-cylinder) internal combustion engine 10.

The internal combustion engine 10 includes a cylinder block section 20 that includes a cylinder block lower case, an oil pan, etc., a cylinder head section 30 fixed to the cylinder block section 20, an intake system 40 for supplying gasoline mixture to the cylinder block section 20, and an exhaust system 50 for releasing exhaust gas from the cylinder block section 20 to the outside.

The cylinder block section 20 includes cylinders 21, pistons 22, connecting rods 23, and a crankshaft 24. The pistons 22 reciprocate within the cylinders 21. The reciprocating movements of the pistons 22 are transferred to the crankshaft 24 via the connecting rods 23, thereby rotating the crankshaft 24. The cylinders 21, heads of the pistons 22 and the cylinder head section 30 define combustion chambers 25.

The cylinder head section 30 includes intake ports 31 connected in communication to the combustion chambers 25, intake valves 32 that open and close the intake ports 31, a variable intake timing device 33 that includes an intake camshaft for driving the intake valves 32, and that continuously changes the phase angle of the intake camshaft, an actuator 33a of the variable intake timing device 33, exhaust ports 34 connected in communication to the combustion chambers 25, exhaust valves 35 that open and close the exhaust ports 34, an exhaust camshaft 36 for driving the exhaust valves 35, ignition plugs 37, an igniter 38 that includes an ignition coil for producing a high voltage to be supplied to the ignition plugs 37, and injectors (fuel injection means) 39 that inject fuel into the intake ports 31.

The intake system 40 includes an intake pipe 41, including an intake manifold, which is connected in communication to the intake ports 31 and which forms an intake passage together with the intake ports 31, an air filter 42 provided at an end portion of the intake pipe 41, a throttle valve 43 provided within the intake pipe 41 for varying the sectional area of the opening of the intake passage, a throttle valve actuator 43a formed by a DC motor which forms throttle valve drive means, a swirl control valve (hereinafter, referred to as "SCV") 44, and an SCV actuator 44a formed by a DC motor.

The exhaust system 50 includes an exhaust manifold 51 connected in communication to the exhaust ports 34, an exhaust pipe 52 connected in communication to the exhaust manifold 51, an upstream-side three-way catalyst 53 (also termed "upstream-side catalytic converter" or "start catalytic converter", but hereinafter referred to as "first catalyst 53") disposed in the exhaust pipe 52 (between exhaust pipe portions), a downstream-side three-way catalyst 54 (also termed "under-floor catalytic converter" due to the mounting below a floor of a vehicle, but hereinafter referred to as "second catalyst 54") disposed in the exhaust pipe 52 (between exhaust pipe portions) downstream of the first catalyst 53. The exhaust ports 34, the exhaust manifold 51 and the exhaust pipe 52 form an exhaust passage.

This system includes a hot wire air flow meter 61, a throttle position sensor 62, a cam position sensor 63, a crank position sensor 64, a water temperature sensor 65, an air-fuel ratio sensor 66 disposed in the exhaust passage upstream of the first catalyst 53 (hereinafter, referred to as "upstream-side air-fuel ratio sensor 66"), an air-fuel ratio sensor 67 disposed in the exhaust passage downstream of the first catalyst 53 and upstream of the second catalyst 54 (hereinafter, referred to as "downstream-side air-fuel ratio sensor 67"), and an accelerator operation amount sensor 68.

Figure 2:
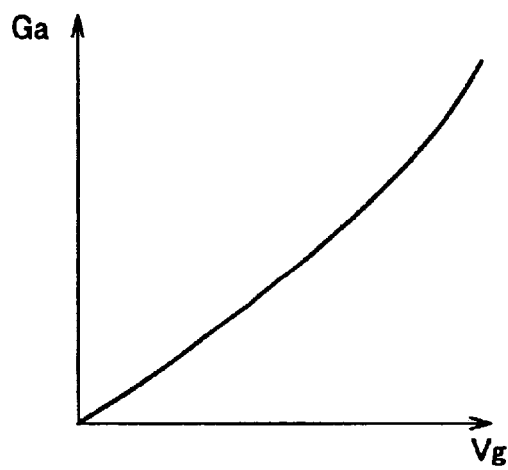
FIG. 2 is a graph (map) indicating a relationship between the output voltage of an air flow meter shown in FIG. 1 and the measured intake air flow.

The hot wire air flow meter 61 is designed to output a voltage Vg corresponding to the per-unit-time mass flow of intake air in the intake pipe 41. A relationship between the output Vg of the air flow meter 61 and the measured intake air amount (flow) Ga is indicated in FIG. 2. The throttle position sensor 62 is designed to detect the degree of opening of the throttle valve 43 and output a signal that indicates the degree of throttle valve opening TA. The cam position sensor 63 is designed to generate a signal (G2 signal) having a pulse at every rotational angle of 90° of the intake camshaft (that is, every rotational angle of 180° of the crankshaft 24). The crank position sensor 64 is designed to output a signal that has a narrow pulse at every 10° rotation of the crankshaft 24 and has a wide pulse at every 360° rotation of the crankshaft 24. This signal indicates the engine rotation speed NE. The water temperature sensor 65 is designed to detect the temperature of cooling water of the internal combustion engine 10 and output a signal indicating the cooling water temperature THW.

Figure 3:
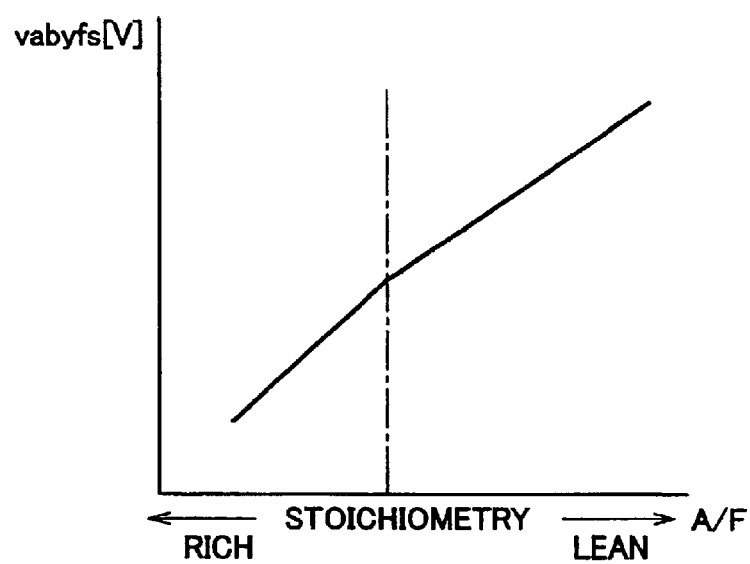
FIG. 3 is a graph (map) indicating a relationship between the output voltage of an upstream-side air-fuel ratio sensor shown in FIG. 1 and the air-fuel ratio.
Figure 4:
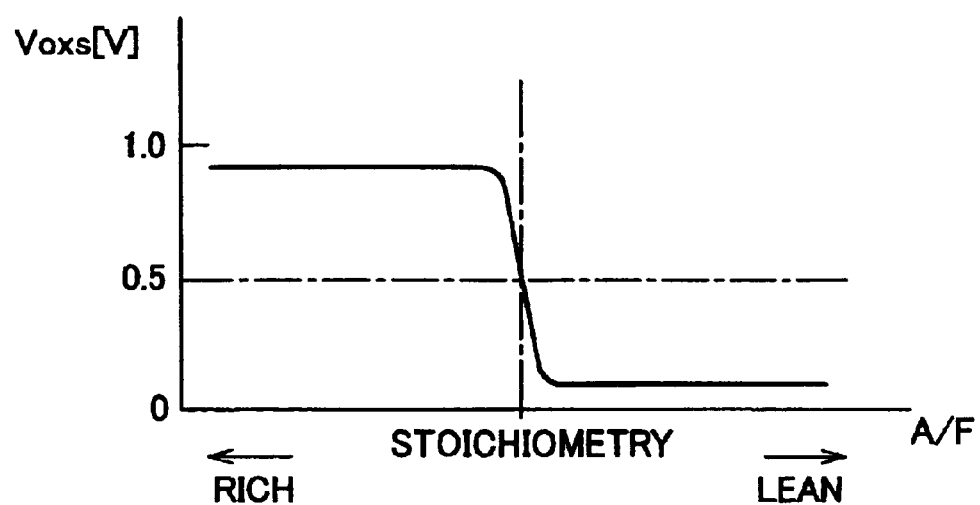
FIG. 4 is a graph (map) indicating a relationship between the output voltage of a downstream-side air-fuel ratio sensor shown in FIG. 1 and the air-fuel ratio.

The upstream-most air-fuel ratio sensor 66 is a limiting current type oxygen concentration sensor, and is designed to output an electric current corresponding to the air-fuel ratio A/F, and output a voltage vabyfs corresponding to the current as indicated in FIG. 3. As is apparent from FIG. 3, the upstream-side air-fuel ratio sensor 66 allows high-precision detection of the air-fuel ratio A/F over a wide range. The downstream-side air-fuel ratio sensor 67 is an electromotive force type (concentration cell type) oxygen concentration sensor, and is designed to output a voltage Voxs that sharply changes at the stoichiometric air-fuel ratio as indicated in FIG. 4 More specifically, the downstream-side air-fuel ratio sensor 67 outputs a voltage of about 0.1 (V) when the air-fuel ratio is lean of the stoichiometric air-fuel ratio, and outputs a voltage of about 0.9 (V) when the air-fuel ratio is rich of the stoichiometric air-fuel ratio, and outputs a voltage of about 0.5 (V) when the air-fuel ratio is equal to the stoichiometric air-fuel ratio. The accelerator operation amount sensor 68 is designed to detect the amount of operation of an accelerator pedal 81 operated by a driver, and to output a signal indicating the operation amount Accp of the accelerator pedal 81.

An electric control unit 70 is a microcomputer that includes a CPU 71, a ROM 72 in which routines (programs) executed by the CPU 71, tables (look-up tables, maps), constants, etc., are pre-stored, a RAM 73 into which the CPU 71 temporarily stores data when necessary, a backup RAM 74 that stores data when a power supply is on, and that retains the stored data while the power supply is off, an interface 75 that includes an AD converter, etc., which are interconnected by a bus. The interface 75 is connected to the sensors 61 to 68, and supplies signals from the sensors 61 to 68 to the CPU 71, and sends drive signals to the actuator 33a of the variable intake timing device 33, the igniter 38, the injectors 39, the throttle valve actuator 43a, and the SCV actuator 44a.

(OVERVIEW OF CONTROL AT ORDINARY TIME) An overview of the control performed by the above-described air-fuel ratio control apparatus will be described below.

The first catalyst 53 (as well as the second catalyst 54) oxidizes HC and CO and reduces NOx, and thereby removes these harmful components, if the air-fuel ratio of gas flowing into the first catalyst 53 is the stoichiometric air-fuel ratio. Furthermore, the first catalyst 53 has the function of storing (absorbing) oxygen (oxygen storage function). Due to the oxygen storage function, the catalyst is able to substantially remove HC, CO and NOx even if the air-fuel ratio deviates from the stoichiometric air-fuel ratio to a certain extent. That is, if the engine air-fuel ratio becomes lean of stoichiometry and the gas flowing into the first catalyst 53 comes to contain a large amount of NOx, the first catalyst 53 detaches and stores oxygen molecules from NOx, and therefore reduces NOx, that is, removes NOx. If the engine air-fuel ratio becomes rich of stoichiometry and the gas flowing into the first catalyst 53 comes to contain large amounts of HC and CO, the catalyst oxidizes and therefore removes HC and CO by giving them stored oxygen.

Hence, in order to efficiently remove large amounts of HC and CO continuously flowing into the first catalyst 53, the first catalyst 53 needs to have a large amount of stored oxygen. Conversely, in order to efficiently remove a large amount of NOx continuously flowing into the catalyst, the first catalyst 53 needs to be in a state where the catalyst is able to store a sufficiently large amount of oxygen. As is apparent from the above discussion, the emissions control capability of the first catalyst 53 is dependent on the maximum oxygen storage amount, that is, the maximum amount of oxygen that the first catalyst 53 is able to store.

However, a three-way catalyst, such as the first catalyst 53, degrades due to the poisoning caused by lead, sulfur and the like contained in fuel, or heat given to the catalyst. In relation to the degradation, the maximum oxygen storage amount of the catalyst gradually decreases. In order to maintain a good emission state even if the maximum oxygen storage amount has decreased, it is necessary to perform a control such that the air-fuel ratio of gas let out of the first catalyst 53 becomes very close to the stoichiometric air-fuel ratio.

Therefore, the air-fuel ratio control apparatus of the embodiment controls the air-fuel ratio of a mixture gas that is supplied to the engine 10 (i.e., the engine air-fuel ratio) in accordance with the output Voxs of the downstream-side air-fuel ratio sensor 67 (i.e., the air-fuel ratio of gas downstream of the first catalyst), that is, a quantity of state related to exhaust of the engine 10, so that the output of the downstream-side air-fuel ratio sensor 67 becomes equal to a target value Voxsref that appropriately corresponds to the stoichiometric air-fuel ratio.

More specifically, when the output of the downstream-side air-fuel ratio sensor 67 reaches a value that indicates an air-fuel ratio lean of stoichiometry, the air-fuel ratio control apparatus determines a subsidiary feedback control amount vafsfb by performing a proportional-plus-integral process (PI process) of a deviation between the output Voxs of the downstream-side air-fuel ratio sensor 67 and the target value Voxsref that appropriately corresponds to the stoichiometric air-fuel ratio, and corrects the output vabyfs of the upstream-side air-fuel ratio sensor 66 by the subsidiary feedback control amount vafsfb. As a result, the actual engine air-fuel ratio is set so as to apparently be on the lean side of the air-fuel ratio detected by the upstream-side air-fuel ratio sensor 66.

Then, the air-fuel ratio control apparatus computes a feedback control amount FDi for adjusting the amount of fuel supplied to the engine (fuel injection amount) so that the corrected apparent air-fuel ratio becomes equal to the target air-fuel ratio abyfr that is equal to the stoichiometric air-fuel ratio. Using the computed feedback correction amount FDi, the control apparatus corrects a value (basic fuel injection amount Fbase) obtained by dividing a value Mc that corresponds to the amount of cylinder intake air provided during an intake stroke of the engine by the stoichiometric air-fuel ratio. Then, the control apparatus injects the corrected amount of fuel injection from the injector 39, thus executing an engine air-fuel ratio feedback control.

Similarly, when the output of the downstream-side air-fuel ratio sensor 67 reaches a value that indicates an air-fuel ratio rich of stoichiometry, the air-fuel ratio control apparatus determines a subsidiary feedback control amount vafsfb by performing a proportional-plus-integral process (PI process) of a deviation between the output Voxs of the downstream-side air-fuel ratio sensor 67 and the target value Voxsref that appropriately corresponds to the stoichiometric air-fuel ratio, and corrects the output vabyfs of the upstream-side air-fuel ratio sensor 66 by the subsidiary feedback control amount vafsfb. As a result, the actual engine air-fuel ratio is set so as to apparently be on the rich side of the air-fuel ratio detected by the upstream-side air-fuel ratio sensor 66. Then, a feedback control is performed such that the corrected apparent air-fuel ratio becomes equal to a target air-fuel ratio abyfr that equals the stoichiometric air-fuel ratio. In this manner, the feedback control is performed so that the air-fuel ratio of gas upstream of the first catalyst 53 becomes equal to the stoichiometric air-fuel ratio.

(OVERVIEW OF CONTROL AT TIME OF CATALYST DEGRADATION DETERMINATION) As described above, the maximum oxygen storage amount of a catalyst gradually decreases as the catalyst degrades. That is, the maximum oxygen storage amount is a degradation criterion value that changes in accordance with the degree of catalyst degradation. The maximum oxygen storage amount also changes depending on the catalyst temperature. Therefore, the air-fuel ratio control apparatus of the embodiment computes and estimates an actual maximum oxygen storage amount CmaxR of a catalyst (the first catalyst 53 in the embodiment), and corrects the actual maximum oxygen storage amount CmaxR to determine a maximum oxygen storage amount Cmax (hereinafter, referred to as "post-normalization maximum oxygen storage amount Cmaxnorm") that is expected to be present when the catalyst has a certain temperature (hereinafter, referred to as "normalization temperature"). By determining whether the post-normalization maximum oxygen storage amount Cmaxnorm is less than a catalyst degradation determination-purposed threshold value (hereinafter, also referred to as "catalyst degradation criterion value") Cmaxth, the control apparatus determines whether the first catalyst 53 has degraded. Further detailed description will be given below.

<HOW TO FIND ACTUAL MAXIMUM OXYGEN STORAGE AMOUNT CmaxR> As indicated in FIG. 5(A), the air-fuel ratio control apparatus first controls the air-fuel ratio of gas upstream of the first catalyst 53 (i.e., the air-fuel ratio of a mixture supplied to the engine) to a predetermined set lean air-fuel ratio abyfLean that is lean of stoichiometry, at a time point t1.

As a result, a gas having a lean air-fuel ratio flows into to the first catalyst 53, so that, as indicated in FIG. 5(C), the oxygen storage amount OSA of the first catalyst 53 gradually increases, and reaches a maximum oxygen storage amount Cmax2 at a time point t2. Therefore, at the time point t2, an oxygen-containing gas (lean air-fuel ratio gas) starts to flow out of the first catalyst 53, and the output Voxs of the downstream-side air-fuel ratio sensor 67 changes from a value indicating an air-fuel ratio rich of stoichiometry to a value indicating an air-fuel ratio lean of stoichiometry as indicated in FIG. 5(B). The operation performed during the time t1 to t2 will be termed operation in the first mode (Mode=1).

As the output Voxs of the downstream-side air-fuel ratio sensor 67 changes from the rich air-fuel ratio-indicating value to the lean air-fuel ratio-indicating value at the time point t2, the control apparatus controls the air-fuel ratio of gas upstream of the first catalyst 53 to a predetermined set rich air-fuel ratio abyfRich that is rich of stoichiometry.

As a result, a rich air-fuel ratio gas flows into the first catalyst 53, so that oxygen stored in the first catalyst 53 is consumed to oxidize unburned components, such as HC and CO, that flow into the first catalyst 53. Thus, the amount of oxygen stored in the first catalyst 53 decreases from the maximum oxygen storage amount Cmax2. Then at a time point t3, the oxygen storage amount of the first catalyst 53 reaches "0", so that a rich air-fuel ratio gas starts to flow out of the first catalyst 53. Therefore, the output Voxs of the downstream-side air-fuel ratio sensor 67 changes from the lean air-fuel ratio-indicating value to a rich air-fuel ratio-indicating value. The operation during the time t2 to t3 will be termed operation in the second mode (Mode=2).

During the period between the time points t2 and t3, the air-fuel ratio control apparatus estimates the maximum oxygen storage amount Cmax of the first catalyst 53 as a maximum oxygen storage amount Cmax2 as described below. That is, during the period from the time point t2 when the upstream-of-first catalyst air-fuel ratio is set at the set rich air-fuel ratio to the time point t3 when the output Voxs of the downstream-side air-fuel ratio sensor 67 changes to the rich air-fuel ratio-indicating value-indicating value, the apparatus calculates amounts of change ΔO2 in the oxygen storage amount and accumulates the amounts of change ΔO2 as in mathematical expressions 1 and 2, thereby calculating the accumulated value at the time point t3 as a maximum oxygen storage amount Cmax2.

$$\Delta O2 = 0.23 \cdot mfr \cdot (stoich - abyfs) \quad \text{[Math. 1]}$$

$$Cmax2 = \Sigma \Delta O2(\text{time section } t=t2 \text{ to } t3) \quad \text{[Math. 2]}$$

In mathematical expression 1, the value "0.23" is the weight proportion of oxygen contained in the atmosphere. mfr is the total of fuel injection amount Fi within a predetermined time (calculation cycle tsample), and stoich is the stoichiometric air-fuel ratio (e.g., 14.7). abyfs is the air-fuel ratio A/F detected by the upstream-side air-fuel ratio sensor 66 in the predetermined time tsample. It is to be noted herein that abyfs may be the mean value of the air-fuel ratios A/F detected by the upstream-most air-fuel ratio sensor 66 within the predetermined time tsample.

As indicated in mathematical expression 1, the multiplication of the total mfr of the fuel injection amount Fi within the predetermined time tsample by the deviation (stoich–abvfs) of the detected air-fuel ratio A/F from the stoichiometric air-fuel ratio provides the shortfall of air in the predetermined time tsample, and the multiplication of the shortfall of air by the weight proportion of oxygen provides the amount of change ΔO2 in the oxygen storage amount (i.e., the amount of consumption of stored oxygen) in the predetermined time tsample. Then, as indicated in mathematical expression 2, the accumulation of the amounts of change ΔO2 in the oxygen storage amount over the time of t2 to t3 provides an estimate of the amount of oxygen consumed during the period starting at the state where the amount of oxygen stored in the first catalyst 53 is maximum and ending at the state where the stored oxygen is completely consumed, that is, the maximum oxygen storage amount Cmax2.

In this embodiment, the upstream-of-first catalyst air-fuel ratio is controlled to the constant set rich air-fuel ratio abyfRich during the time t2 to t3. Therefore, if the cylinder intake air amount Mc during this period is constant, the maximum oxygen storage amount Cmax2 can easily be determined as 0.23·mfr2·(stoich–abyfRich)·Δt2 based on the mathematical expressions 1 and 2, where Δt2 is the length of time t2 to t3, and mfr2 is the amount of fuel supplied per unit time during the period.

As the output of the downstream-side air-fuel ratio sensor 67 changes from the lean air-fuel ratio-indicating value to the rich air-fuel ratio-indicating value at the time point t3, the apparatus controls the upstream-of-first catalyst air-fuel ratio to the aforementioned set lean air-fuel ratio abyfLean that is lean of stoichiometry. Therefore, a lean air-fuel ratio gas flows into the first catalyst 53. Furthermore, at the time point t3, the oxygen storage amount of the first catalyst 53 is "0". Therefore, the amount of oxygen stored in the first catalyst 53 continuously increases from "0" from the time point t3 on, and reaches the maximum oxygen storage amount Cmax3 at a time point t4 As a result, at the time point t4, an oxygen-containing gas having an air-fuel ratio lean of stoichiometry starts to flow out of the first catalyst 53, and the output Voxs of the downstream-side air-fuel ratio sensor 67 changes from the rich air-fuel ratio-indicating value to a lean air-fuel ratio-indicating value. The operation performed between the time points t3 and t4 is termed operation in the third mode (Mode=3).

During the period between the time points t3 and t4, too, the apparatus estimates the maximum oxygen storage amount Cmax of the first catalyst 53 as a maximum oxygen storage amount Cmax3 as described below. That is, at the time point t3, the oxygen storage amount of the first catalyst 53 is "0". The time point t4 when the output Voxs of the downstream-side air-fuel ratio sensor 67 changes to the lean air-fuel ratio-indicating value means a time point when the oxygen storage amount of the first catalyst 53 reaches the maximum oxygen storage amount Cmax. Therefore, during the period between the time points t3 and t4, the apparatus calculates and accumulates amounts of change ΔO2 in the oxygen storage amount as in mathematical expressions 3 and 4, thereby calculating and estimating the accumulated value at the time point t4 as the maximum oxygen storage amount Cmax3.

$$\Delta O2 = 0.23 \cdot mfr \cdot (abyfs - stoich) \quad \text{[Math. 3]}$$

$$Cmax3 = \Sigma \Delta O2(\text{time section } t=t3 \text{ to } t4) \quad \text{[Math. 4]}$$

As indicated in mathematical expression 3, the multiplication of the total mfr of the fuel injection amount within the predetermined time tsample by the deviation (abyfs–stoich) of the air-fuel ratio A/F from the stoichiometric air-fuel ratio provides the excess amount of air in the predetermined time tsample, and the multiplication of the excess amount of air by the weight proportion of oxygen provides the amount of change ΔO2 in the oxygen storage amount (i.e., the amount of oxygen stored) in the predetermined time tsample. Then, as indicated in mathematical expression 4, the accumulation of the amounts of change ΔO2 in the oxygen storage amount over the time of t3 to t4 provides an estimate of the amount of oxygen stored during the period starting at the state where the amount of oxygen stored in the first catalyst 53 is "0" and ending at the where a maximum storage of oxygen is reached, that is, the maximum oxygen storage amount Cmax3.

In this case, too, the upstream-of-first catalyst air-fuel ratio is controlled to the constant set lean air-fuel ratio abyfLean during the time t3 to t4 Therefore, if the cylinder intake air amount Mc during this period is constant, the maximum oxygen storage amount Cmax3 can easily be determined as 0.23·mfr3·(abyfLean–stoich)·Δt3 where Δt3 is the length of time t3 to t4, and abyfLean is the set lean air-fuel ratio, and mfr3 is the amount of fuel supplied per unit time during the period.

Meanwhile, the apparatus calculates an average temperature of the catalyst during the period of the second and third modes (period of calculation of the actual maximum oxygen storage amount CmaxR) as a calculation period catalyst temperature Tave, and calculates an average value of the intake air flow Ga during the period as a calculation period intake air flow Gaave, on the basis of the states of operation of the engine, such as the intake air flow Ga and the like.

Then, at the time point t4, the apparatus starts again the above-described air-fuel ratio feedback control to bring the air-fuel ratio of a mixture taken into the engine back to the stoichiometric air-fuel ratio. After the time point t4, the apparatus computes a mean value of the maximum oxygen storage amounts Cmax2 and Cmax3 determined as described above, as an actual maximum oxygen storage amount CmaxR of the first catalyst 53. Above described is the principle of calculation of the actual maximum oxygen storage amount CmaxR of the first catalyst 53.

<NEED TO NORMALIZE ACTUAL MAXIMUM OXYGEN STORAGE AMOUNT CmaxR, NORMALIZATION THEREOF, AND CATALYST DEGRADATION DETERMINATION> Next described will be the need for normalization of the actual maximum oxygen storage amount CmaxR computed as described above, and a method for the normalization, as well as a catalyst degradation determining method based on the normalized maximum oxygen storage amount Cmax.

Figure 6:
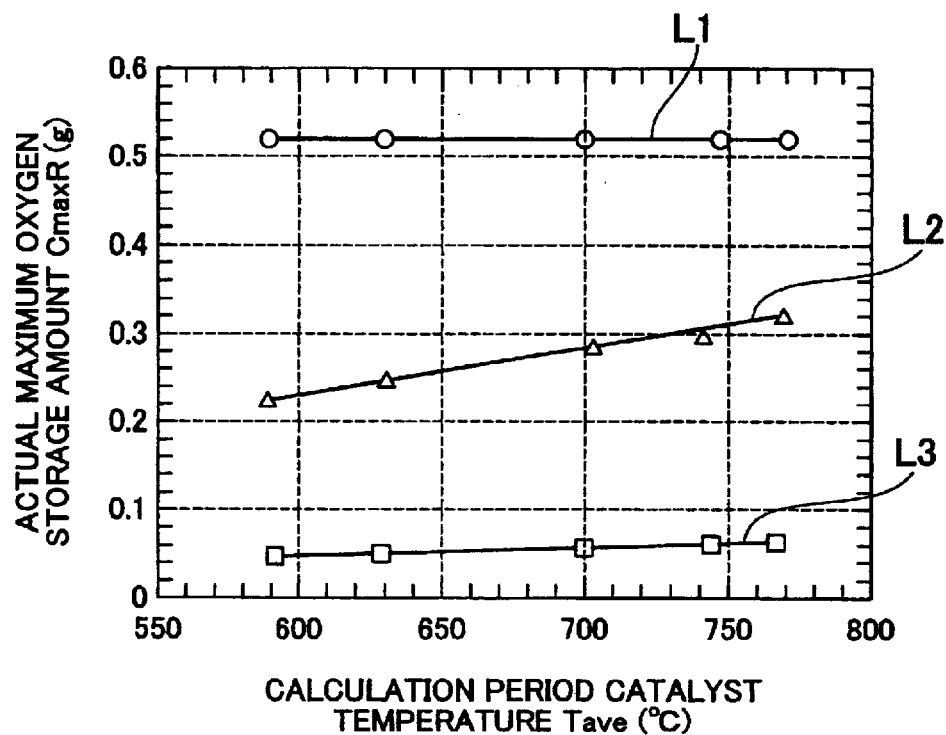
FIG. 6 is a graph indicating relationships between the actual maximum oxygen storage amount and the calculation period catalyst temperature during the period of calculation of the actual maximum oxygen storage amount.

FIG. 6 is a graph indicating relationships between the actual maximum oxygen storage amount CmaxR and the calculation period catalyst temperature Tave during the period of calculating the actual maximum oxygen storage amount CmaxR. In the graph, a line L1 indicates a characteristic of a catalyst that has not degraded at all (hereinafter, referred to as "brand-new catalyst"), and a line L2 indicates a characteristic of a catalyst that has degraded to some degree (hereinafter, referred to as "moderately degraded catalyst"), and a line L3 indicates a characteristic of a catalyst that has further degraded so that it must be determined that the catalyst is a degraded catalyst (hereinafter, referred to as "severely degraded catalyst").

As is apparent from FIG. 6, the brand-new catalyst and the severely degraded catalyst exhibit substantially no change in the actual maximum oxygen storage amount CmaxR despite changes in the calculation period catalyst temperature Tave. In contrast, the actual maximum oxygen storage amount CmaxR of the moderately degraded catalyst gradually increases with increases in the calculation period catalyst temperature Tave.

Figure 7:
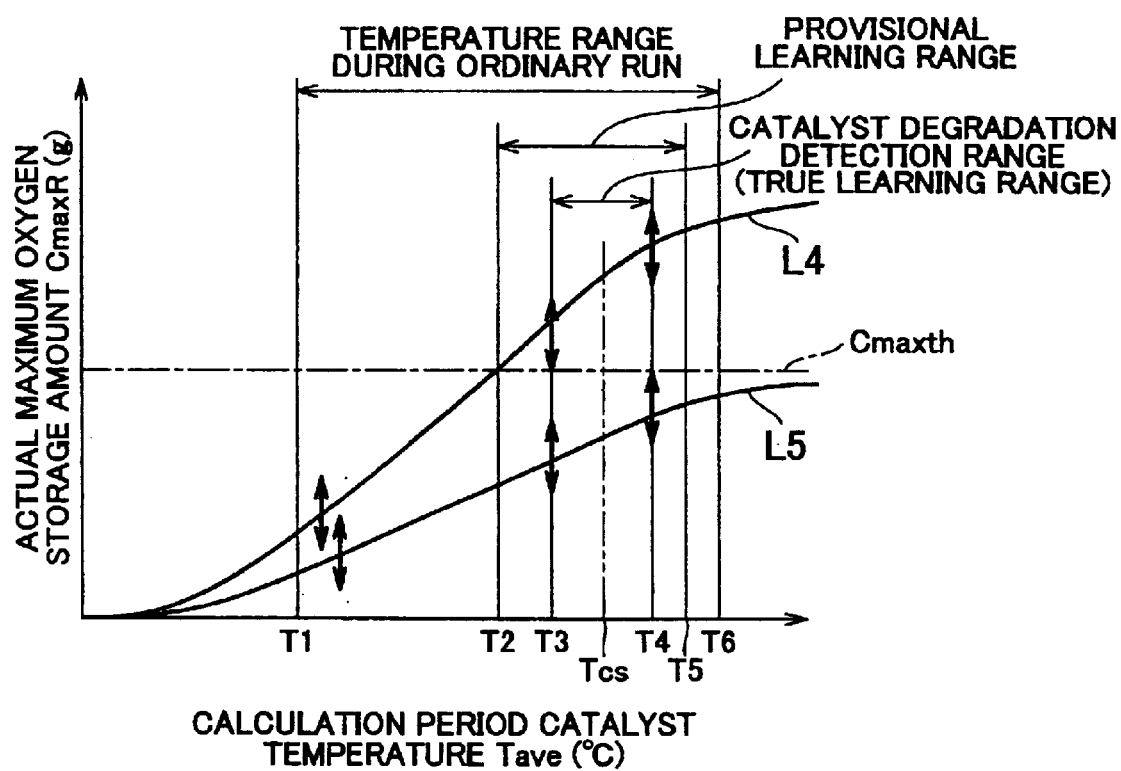
FIG. 7 is a graph indicating relationships between the actual maximum oxygen storage amount and the calculation period catalyst temperature during the period of calculation of the actual maximum oxygen storage amount.

This will be further explained below. FIG. 7, similar to FIG. 6, is a graph indicating relationships between the actual maximum oxygen storage amount CmaxR and the calculation period catalyst temperature Tave. In the graph, a line L4 indicates a characteristic of a moderately degraded catalyst that has begun degrading but still has a high emissions control capability and therefore does not need to be determined as a degraded catalyst, and a line L5 indicates a characteristic of a severely degraded catalyst that has degraded to a considerably reduced emissions control capability, and therefore needs to be determined as a degraded catalyst. Furthermore in the graph of FIG. 6, bold arrows indicate ranges of inevitable measurement error of the actual maximum oxygen storage amount CmaxR, and a one-dot chain line indicates the catalyst degradation criterion value Cmaxth.

As can be understood from FIG. 7, in order to avoid false determination as to whether a catalyst has degraded based on a result of comparison of the actual maximum oxygen storage amount CmaxR with the catalyst degradation criterion value Cmaxth despite measurement errors of the actual maximum oxygen storage amount CmaxR, it is necessary that the actual maximum oxygen storage amount CmaxR of the moderately degraded catalyst (line L4) be always greater than the catalyst degradation criterion value Cmaxth and the actual maximum oxygen storage amount CmaxR of the severely degraded catalyst (line L5) be always less than the catalyst degradation criterion value Cmaxth. Therefore, the catalyst temperature during the period of calculating an actual maximum oxygen storage amount CmaxR needs to be limited so as to allow acquisition of above-required actual maximum oxygen storage amounts CmaxR. As a result, the catalyst temperature (calculation period catalyst temperature Tave) that allows computation of an actual maximum oxygen storage amount CmaxR used for catalyst degradation determination is strictly limited to the range of T3 to T4 whereas the catalyst temperature during normal operation ranges between T1 and T6. Consequently, the frequency of determination regarding catalyst degradation becomes low.

Figure 8:
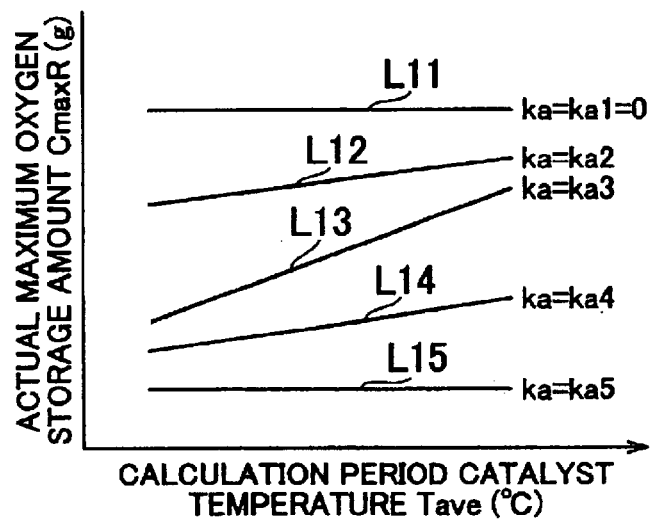
FIG. 8 is a graph indicating relationships between the actual maximum oxygen storage amount and the calculation period catalyst temperature during the period of calculation of the actual maximum oxygen storage amount.

The present inventors have investigated the relationship between the calculation period catalyst temperature Tave and the actual maximum oxygen storage amount CmaxR within a range of catalyst temperature in which the catalyst is activated to some degree (a range of catalyst temperature possible during an ordinary engine operation), and have found that the calculation period catalyst temperature Tave and the actual maximum oxygen storage amount CmaxR have relationships as indicated in FIG. 8. In FIG. 8, a line L11 indicates the characteristic of a brand-new catalyst (a catalyst that has not degraded at all), and lines L12, L13, L14 indicate the characteristics of catalysts with progressively increased degrees of degradation, and a line L15 indicates the characteristic of a catalyst that has completely degraded.

As is apparent from FIG. 8, the actual maximum oxygen storage amount CmaxR monotonously increases substantially in proportion to the calculation period catalyst temperature Tave, and the relationship therebetween can be approximated by a linear expression (straight line). Furthermore, with regard to the brand-new catalyst, the actual maximum oxygen storage amount CmaxR is independent of the calculation period catalyst temperature Tave, and the gradient Ka (=Cmax/Tave) of the maximum oxygen storage amount Cmax with respect to the calculation period catalyst temperature Tave is substantially "0" (see a gradient Ka1). As can be seen from lines L12, L13, the gradient Ka gradually increases approximately from "0" with progress of catalyst degradation from the brand-new condition (Ka1<Ka2<Ka3). As the catalyst degradation further progresses, the gradient Ka gradually decreases (Ka3>Ka4), and the gradient Ka of the completely degraded catalyst (=Ka5) becomes substantially equal to "0", as can be seen from lines L13 to L15.

Therefore, in the apparatus of the embodiment, the relationships indicated in FIG. 8 (the relationships between the calculation period catalyst temperature Tave and the actual maximum oxygen storage amount CmaxR) are determined beforehand separately for individual degrees of degradation of the catalysts, and gradients Ka, that is, characteristic values that specify the degrees of catalyst degradation corresponding to the relationships equivalent to the aforementioned relationships, are pre-stored as a gradient determining map in the ROM 72 provided as data storage. A present-time gradient Ka is determined on the basis of an actual maximum oxygen storage amount CmaxR acquired within a catalyst temperature range in which the actual maximum oxygen storage amount CmaxR of a catalyst that should not be determined as a degraded catalyst and the actual maximum oxygen storage amount CmaxR of a catalyst that should be determined as a degraded catalyst do not assume equal values (in this embodiment, the catalyst temperature range selected is the same as the conventional catalyst degradation detection range indicated in FIG. 7, that is, the temperature range of T3 to T4, and will be simply referred to as "learning range"), and the calculation period catalyst temperature Tave at the time of acquisition of the actual maximum oxygen storage amount CmaxR, and the gradient determining map. The thus-determined gradient Ka is stored in the backup RAM 74. That is, the gradient Ka is learned.

Then, if an actual maximum oxygen storage amount CmaxR is acquired in a temperature range outside the learning range, the acquired actual maximum oxygen storage amount CmaxR is corrected and normalized to a maximum oxygen storage amount Cmax acquired at a predetermined catalyst temperature Tcs on the basis of the calculation period catalyst temperature Tave at the time of acquisition of the actual maximum oxygen storage amount CmaxR, and mathematical expression 5, which is a proportional expression. After that, if the post-normalization maximum oxygen storage amount Cmaxnorm is less than the catalyst degradation criterion value Cmaxth, it is determined that the catalyst has degraded. The aforementioned temperature Tcs, termed "normalization temperature" in the below description, is set at a predetermined temperature within the learning range of T3 to T4.

$$Cmaxnorm = CmaxR + Ka \cdot (Tcs - Tave) \qquad [\text{Math. 5}]$$

Figure 9:
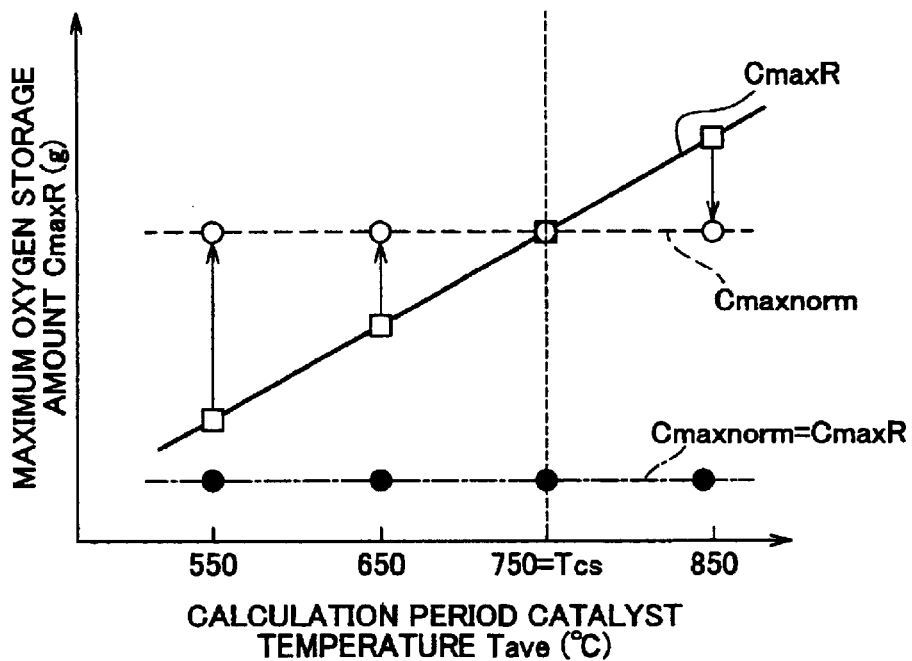
FIG. 9 is a graph conceptually illustrating an operation of normalization of maximum oxygen storage amounts toward normalized temperatures.

FIG. 9 is a graph conceptually illustrating the operation of normalization based on mathematical expression 5. As indicated in FIG. 9, the actual maximum oxygen storage amount CmaxR of a normal catalyst (solid line) that has begun degrading but still has a high emissions control capability and does not need to be determined as a degraded catalyst is converted into the post-normalization maximum oxygen storage amount Cmaxnorm indicated by a broken line through the normalization based on mathematical expression 5. In contrast, the actual maximum oxygen storage amount CmaxR of a catalyst that needs to be determined as a degraded catalyst remains unchanged despite execution of the normalization, that is, is equal to the post-normalization maximum oxygen storage amount Cmaxnorm indicated by a one-dot chain line, since the gradient Ka of the actual maximum oxygen storage amount CmaxR is "0".

Thus, the actual maximum oxygen storage amounts CmaxR of a normal catalyst (that should not be determined as a degraded catalyst) and a degraded catalyst (that should be determined as a degraded catalyst) which are sometimes measured as equal values due to measurement error particularly when the catalyst temperature is relatively low are corrected to clearly different values by the aforementioned normalization. Therefore, by determining whether the post-normalization maximum oxygen storage amount Cmaxnorm is greater or less than the catalyst degradation criterion value Cmaxth that is a constant threshold value (i.e., a threshold value set between the one-dot chain line and the broken line in FIG. 9), it is possible to determine whether the catalyst has degraded with good precision. That is, the catalyst temperature range that allows catalyst degradation determination (allows acquisition and computation of the actual maximum oxygen storage amount CmaxR used for determination regarding catalyst degradation) can be greatly expanded from the conventional temperature range of T3 to T4 in FIG. 6 to a temperature range of T1 to T6 in FIG. 6. As a result, the frequency of catalyst degradation determination is increased.

<CONDITION FOR LEARNING GRADIENT Ka> The condition for learning the gradient Ka and the like will be further described. As described above, the gradient Ka is determined on the basis of the gradient determining map and an actual maximum oxygen storage amount CmaxR acquired when the calculation period catalyst temperature Tave during the period of calculation of the actual maximum oxygen storage amount CmaxR.

However, when a vehicle is fresh from a factory, or if values of gradient Ka stored in the backup RAM 74 are destroyed or deleted due to, for example, discontinuation of power supplied to the electrically control unit 70 caused by removal of a battery of the vehicle or the like, a long period of time may elapse before acquisition of a correct gradient Ka due to continuation of an operation state in which the calculation period catalyst temperature Tave does not reach the learning range. If in such a case, catalyst degradation determination is suspended until a gradient Ka is acquired, a determination that the catalyst has degraded may possibly become delayed from actual degradation of the catalyst.

In this embodiment, in the case where a gradient Ka is not available, the temperature range of T2 to T5, which is narrower than the normal-operation temperature range of T1 to T6 and is broader than the learning range of T3 to T4 indicated in FIG. 7, is determined as a provisional learning range. If the calculation period catalyst temperature Tave at the time of acquisition of an actual maximum oxygen storage amount CmaxR is within the provisional learning range of T2 to T5, it is determined whether the catalyst has degraded on the basis of whether the acquired actual maximum oxygen storage amount CmaxR is less than the threshold value Cmaxth. In addition, a gradient Ka is determined on the basis of the actual maximum oxygen storage amount CmaxR and the gradient determining map. From then on, using the gradient Ka, the actual maximum oxygen storage amount CmaxR is normalized to perform determination regarding catalyst degradation. Therefore, actual degradation of the catalyst will be relatively promptly followed by a determination that the catalyst has degraded.

Another construction is possible. That is, if a gradient Ka is not available, an acquired actual maximum oxygen storage amount CmaxR is stored into the backup RAM provided that the calculation period catalyst temperature Tave at the time of acquisition of the actual maximum oxygen storage amount CmaxR is within the provisional learning range of T2 to T5. When a plurality of actual maximum oxygen storage amounts CmaxR have been stored in that manner, a mean value of the actual maximum oxygen storage amounts CmaxR is computed. Then, it is determined whether the catalyst has degraded on the basis of whether the mean value is less than the threshold value Cmaxth. It is also possible to adopt a construction in which a gradient Ka is determined on the basis of the mean value and the gradient determining map.

<PREVENTION OF FALSE NORMALIZATION> In order to avoid false normalization, the apparatus of the embodiment performs (1) forced clearance of the gradient Ka, and (2) the monitoring of a correction factor associated with the normalization. These operations will be sequentially described below.

(1) FORCED CLEARANCE OF GRADIENT Ka If the gradient Ka remains un-updated over a certain number of vehicle trips (a "trip" refers to a period starting at the changing of the ignition switch from the off-state to the on-state and ending at the changing of the switch to the off-state), there is a possibility that degradation of the catalyst has progressed and the gradient Ka has changed.

In the embodiment, if the gradient Ka is not updated within a predetermined number of trips, the apparatus clears the gradient Ka, and proceeds to the above-described control of learning a gradient Ka in the provisional learning range as in the aforementioned case where the vehicle is fresh from a factory or the battery was removed. This operation avoids false normalization of an actual maximum oxygen storage amount CmaxR, and therefore improves the precision of determination regarding catalyst degradation. The operation can also avoid an event where it is continually determined that the catalyst has not degraded although the catalyst has actually degraded.

(2) THE MONITORING OF CORRECTION FACTOR
The correction factor Hoseiritu is defined by mathematical expression 6. Since the numerator on the right side of mathematical expression 6, that is, the multiplication product of the gradient Ka and a difference (Tcs−Tave) between the normalization temperature Tcs and the calculation period catalyst temperature Tave, is the amount of correction of the actual maximum oxygen storage amount CmaxR caused by the normalization, the correction factor Hoseiritu is the value of ratio of the amount of correction caused by the normalization to the actual maximum oxygen storage amount CmaxR.

$$\text{Hoseiritu}=Ka\cdot(Tcs-Tave)/CmaxR \qquad [\text{Math. 6}]$$

Figure 10:
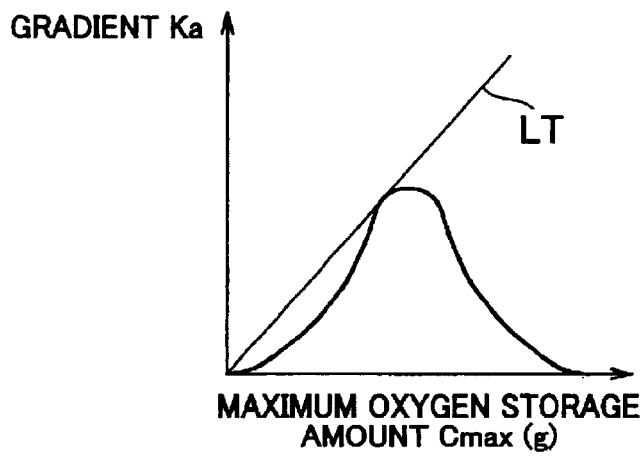
FIG. 10 is a graph indicating a relationship between the actual maximum oxygen storage amount and the gradient Ka, that is, the ratio of the actual maximum oxygen storage amount to the calculation period catalyst temperature.

The correction factor Hoseiritu becomes less than a predetermined value (correction abnormality criterion value Hth) if the normalization is correctly performed. If the normalization is not correctly performed, the correction factor Hoseiritu becomes greater than the correction abnormality criterion value Hth. This is evident for the following reason. Since the gradient Ka changes in a fashion of normal distribution with respect to the maximum oxygen storage amount Cmax as indicated in FIG. 10, which illustrates a relationship between the gradient Ka and the maximum oxygen storage amount Cmax under a fixed catalyst temperature condition (where the catalyst temperature is constant), the ratio (Ka/Cmax) is less than the gradient of a straight line LT in FIG. 10. The foregoing discussion has been confirmed by experiments.

Therefore, the apparatus of the embodiment monitors whether the correction factor Hoseiritu has become greater than the correction abnormality criterion value Hth. If the correction factor Hoseiritu is greater than the correction abnormality criterion value Hth, the apparatus determines that the normalization is not correctly performed. Then, the apparatus clears the gradient Ka, and proceeds to the aforementioned control of learning a gradient Ka in the provisional learning range as in the case where the vehicle is fresh from a factory or the battery was removed. This operation avoids false normalization of the actual maximum oxygen storage amount CmaxR, and therefore improves the precision of determination regarding catalyst degradation.

<COUNTERMEASURE AGAINST EFFECT CAUSED BY AMOUNT OF GAS INFLOW TO CATALYST, AND CATALYST DEGRADATION DETERMINATION> The actual maximum oxygen storage amount CmaxR also changes depending on the amount of gas that flows into the catalyst (i.e., depending on the engine intake air flow Ga). Therefore, in the apparatus of the embodiment, a threshold value determining map that defines a relationship of the catalyst degradation criterion value Cmaxth to the intake air flow Ga (which, in general, is a relationship where Cmath decreases as the intake air flow Ga increases) is stored in the ROM 72. Then, a catalyst degradation criterion value Cmaxth is determined on the basis of the threshold value determining map and a calculation period intake air flow Gaave, that is, a mean value of intake air flows Ga during the maximum oxygen storage amount Cmax calculation period. The thus-determined catalyst degradation criterion value Cmaxth is compared with the normalized maximum oxygen storage amount Cmaxnorm. If the post-normalization maximum oxygen storage amount Cmaxnorm is greater than the catalyst degradation criterion value Cmaxth, it is determined that the catalyst has not degraded but is normal. If the post-normalization maximum oxygen storage amount Cmaxnorm is not greater than the catalyst degradation criterion value Cmaxth, it is determined that the catalyst has degraded. Above described is an operation principle regarding the catalyst degradation determination performed by the catalyst degradation determining apparatus in accordance with the embodiment of the invention.

(ACTUAL OPERATION) An actual operation of the above-described air-fuel ratio control apparatus will be described below.

Figure 11:
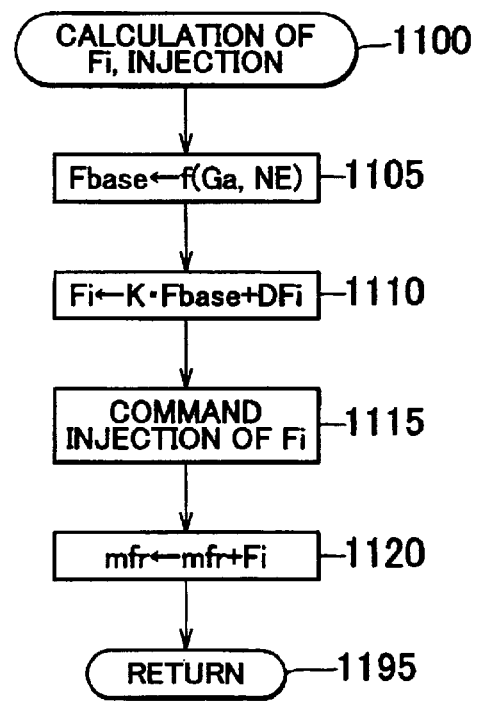
FIG. 11 is a flowchart illustrating a routine for calculating a fuel injection amount executed by a CPU shown in FIG. 1.

<NORMAL AIR-FUEL RATIO FEEDBACK CONTROL> The CPU 71 is designed to cyclically execute a routine of calculating a final fuel injection amount Fi and commanding fuel injection illustrated in the flowchart of FIG. 11, every time the crank angle of any cylinder reaches a predetermined crank angle prior to the intake top dead center (e.g., BTDC 90° CA). Therefore, when the crank angle of a cylinder reaches the predetermined crank angle, the CPU 71 starts the routine at step 1100, and proceeds to step 1105, in which the CPU 71 computes a basic fuel injection amount Fbase for setting the engine air-fuel ratio at the stoichiometric air-fuel ratio, on the basis of the intake air flow Ga measured by the air flow meter 61, and the engine rotation speed NE. Specifically, the basic fuel injection amount Fbase is computed via a function f in which a value obtained through the first-order lag processing of the intake air flow Ga measured by the air flow meter 61 (i.e., a value corresponding to the intake air flow) is divided by the engine rotation speed NE to determine a cylinder intake air amount Mc, and the amount Mc is divided by the stoichiometric air-fuel ratio, that is, the present target air-fuel ratio.

Subsequently in step 1120, the CPU 71 sets a value obtained by adding a below-described air-fuel ratio feedback correction amount (main feedback control amount) DFi to a multiplication product of the basic fuel injection amount Fbase and a factor K, as a final fuel injection amount Fi. The value of air-fuel ratio setting factor K is "1" when the target air-fuel ratio is set at the stoichiometric air-fuel ratio. If the target air-fuel ratio is set rich of stoichiometry, the value of air-fuel ratio setting factor K is set greater than "1".

Subsequently in step 1115, the CPU 71 outputs a command to inject the final fuel injection amount Fi, to the injector 39. Subsequently in step 1120, the CPU 71 sets a value obtained by adding the final fuel injection amount Fi to a present total fuel injection amount mfr, as a new accumulated fuel injection amount mfr. The accumulated fuel injection amount mfr is used for calculation of an oxygen storage amount described below. Then, the CPU 71 proceeds to step 1195, in which the CPU 71 temporarily ends the routine. Thus, the feedback-corrected final fuel injection amount Fi is injected into the cylinder that is about to undergo the intake stroke.

Next, the operation of calculating the main feedback control amount DFi will be described. The CPU 71 executes a routine illustrated by the flowchart of FIG. 12 at every elapse of a predetermined time. When a predetermined timing arrives, the CPU 71 starts the routine at step 1200, and proceeds to step 1205, in which the CPU 71 determines whether an air-fuel ratio feedback control condition (main feedback condition) is met. The air-fuel ratio feedback control condition is fulfilled, for example, in a case where the engine cooling water temperature THW is higher than or equal to a first predetermined temperature, and where the amount of intake air (load) per rotation of the engine is less than or equal to a predetermined value, and where the upstream-side air-fuel ratio sensor 66 is normal, and where the value of a forced air-fuel ratio setting control execution flag XHAN described below is "0", that is, an air-fuel ratio control (active control) of forcibly changing the air-fuel ratio for the purpose of calculation of the maximum oxygen storage amount Cmax is not being executed.

As described below, the forced air-fuel ratio setting control execution flag XHAN, when set at "1", indicates that the air-fuel ratio control of forcibly changing the air-fuel ratio for the purpose of calculation of a maximum oxygen storage amount Cmax. When set at "0", the flag XHAN indicates that the air-fuel ratio control for the purpose of calculation of a maximum oxygen storage amount Cmax is not being executed.

Description will be continued on the assumption that the air-fuel ratio feedback control condition is fulfilled. After making a determination of "YES" in step 1205, the CPU 71 proceeds to step 1210, in which a present-time main feedback control-purposed air-fuel ratio abyfs is computed by converting the sum (vabyfs+vafsfb) of the present output vabyfs of the upstream-side air-fuel ratio sensor 66 and a below-described subsidiary feedback control amount vafsfb on the basis of the map indicated in FIG. 3. The main feedback control-purposed air-fuel ratio abyfs is the aforementioned apparent air-fuel ratio of gas upstream of the first catalyst 53 that is obtained by correcting the output of the upstream-side air-fuel ratio sensor 66 by the subsidiary feedback control amount vafsfb.

Subsequently in step 1215, the CPU 71 computes an actual cylinder fuel supply Fc(k−N) provided at the time of N number of strokes (N number of intake strokes) prior to the present time by dividing a cylinder intake air amount Mc(k−N), that is, the amount of air taken into a cylinder that underwent the intake stroke at the time of N number of strokes prior to the present time, by the aforementioned main feedback control-purposed air-fuel ratio abyfs. The value N varies depending on the engine displacement as well as the distance from the combustion chambers 25 to the upstream-side air-fuel ratio sensor 66, and the like.

A reason why the cylinder intake air amount Mc(k−N) provided at the time of N number of strokes prior to the present time by the main feedback control-purposed air-fuel ratio abyfs in order to determine the cylinder fuel supply Fc(k−N) provided N number of strokes prior to the present time is that a length of time corresponding to N number of strokes is needed for the mixture gas burned in the combustion changer 25 to reach the upstream-side air-fuel ratio sensor 66. The cylinder intake air amount Mc is stored in the RAM 73 in correspondence to the intake stroke of each cylinder.

Subsequently in step 1220, the CPU 71 computes a target cylinder fuel supply Fc(k−N) provided at the time of N number of strokes prior to the present time by dividing the cylinder intake air amount Mc(k−N) provided N number of strokes prior to the present time by the target air-fuel ratio abyfr(k−N) provided N number of strokes prior to the present time. The target air-fuel ratio abyfr herein is the stoichiometric air-fuel ratio, and is a constant value.

Subsequently in step 1225, the CPU 71 sets the value obtained by subtracting the cylinder fuel supply Fc(k−N) from the target cylinder fuel supply Fc(k−N), as a cylinder fuel supply deviation DFc. That is, the cylinder fuel supply deviation DFc is a value that indicates the shortfall or excess regarding the amount of fuel supplied into the cylinder at the time of N number of strokes prior to the present time. Subsequently in step 1230, the CPU 71 computes a main feedback control amount DFi, using mathematical expression 7.

$$DFi=(Gp \cdot DFc+Gi \cdot SDFc) \cdot KFB \quad \text{[Math. 7]}$$

In mathematical expression 7, Gp is a pre-set proportional gain (proportionality factor), and Gi is an integral gain (integration constant). Furthermore in mathematical expression 7, a factor KFB is preferably variable depending on the engine rotation speed NE, the cylinder intake air amount Mc, etc., but is set at "1" in this embodiment. A value SDFc is an integrated value of the cylinder fuel supply deviation DFc, and is updated in step 1235. That is, in step 1235, the CPU 71 computes a new integrated value SDFc of cylinder fuel supply deviations DFc by adding the cylinder fuel supply deviation DFc determined in step 1225 to the existing integrated value SDFc of cylinder fuel supply deviations DFc. Subsequently in step 1295, the CPU 71 temporarily ends the routine.

Therefore, the main feedback control amount DFi is determined by the proportional-plus-integral control. Since the main feedback control amount DFi is reflected in the fuel injection amount in step 1110 of FIG. 11, the shortfall or excess in the fuel supply at the time of N number of strokes prior to the present time is compensated for, and the air-fuel ratio of the internal combustion engine is feedback-controlled so as to become substantially equal to the target air-fuel ratio abyfr.

If it is determined in step 1205 that the air-fuel ratio feedback control condition is not met, the CPU 71 makes a determination of "NO" in step 1205, and proceeds to step 1240. In step 1240, the CPU 71 sets the value of main feedback control amount DFi at "0". Subsequently in step 1295, the CPU 71 temporarily ends the routine. Thus, if the air-fuel ratio feedback control condition is not fulfilled, the CPU 71 sets the main feedback control amount DFi at "0", and does not correct the air-fuel ratio (feedforward fuel supply=K·Fbase).

Next described will be an air-fuel ratio feedback control (subsidiary feedback control) based on the output Voxs of the downstream-side air-fuel ratio sensor 67. Through this subsidiary feedback control, a subsidiary feedback control amount vafsfb is computed.

Figure 13:
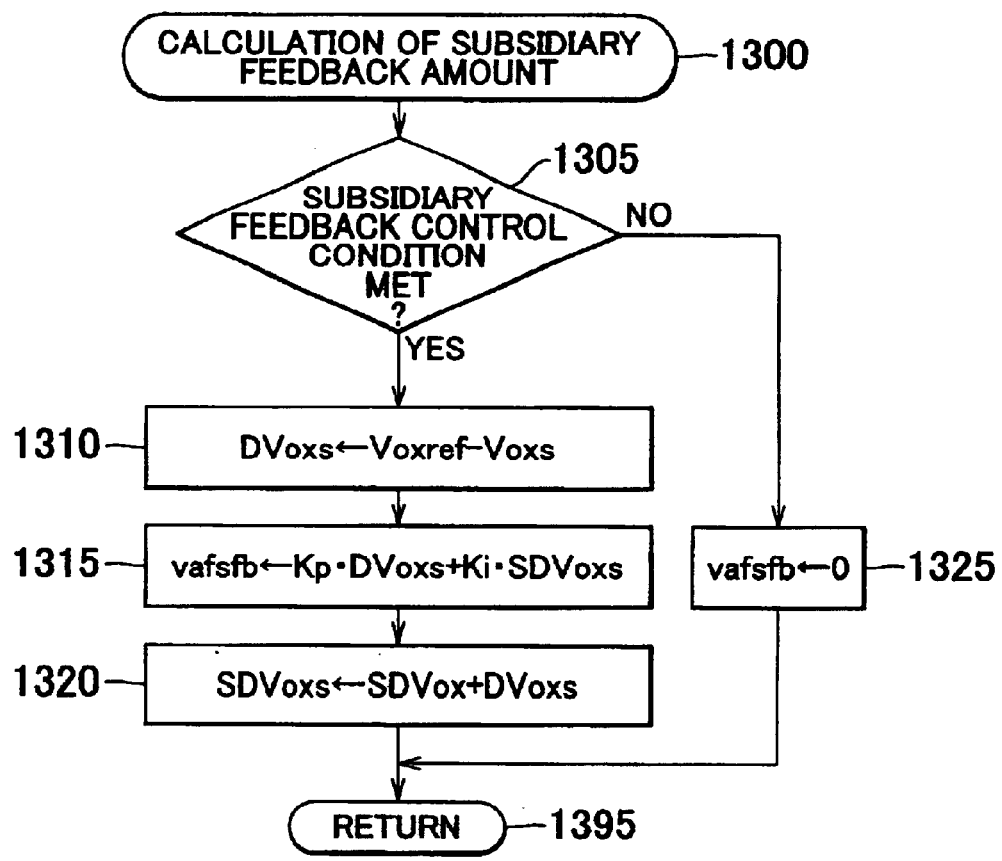
FIG. 13 is a flowchart illustrating a routine for calculating a subsidiary feedback control amount executed by the CPU shown in FIG. 1.

In order to compute the subsidiary feedback control amount vafsfb, the CPU 71 executes a routine illustrated in FIG. 13 at every elapse of a predetermined time. Therefore, when a predetermined timing arrives, the CPU 71 starts the routine at step 1300, and proceeds to step 1305, in which the CPU 71 determines whether a subsidiary feedback control condition is met. The subsidiary feedback control condition is fulfilled, for example, when the engine cooling water temperature THW is higher than or equal to a second predetermined temperature that is higher than the first predetermined temperature, and when the downstream-side air-fuel ratio sensor 67 is normal, in addition to fulfillment of the air-fuel ratio feedback control condition in step 1205.

Description will be continued on the assumption that the subsidiary feedback control condition is fulfilled. After making a determination of "YES" in step 1305, the CPU 71 proceeds to step 1310, in which the CPU 71 computes an output deviation DVoxs by subtracting the present-time output Voxs of the downstream-side air-fuel ratio sensor 67 from a predetermined target value Voxref. The target value Voxsref is set at a value that substantially corresponds to the stoichiometric air-fuel ratio. Subsequently in step 1315, the CPU 71 computes a subsidiary feedback control amount vafsfb as in mathematical expression 8.

$$vafsfb=Kp \cdot DVoxs+Ki \cdot SDVoxs \quad \text{[Math. 8]}$$

In mathematical expression 8, Kp is a pre-set proportional gain (proportionality factor), and Ki is an integral gain (integration constant). SDVoxs is an integrated value of the output deviation DVoxs, and is updated in step 1320. That is, in step 1320, the CPU 71 computes a new integrated value SDVoxs of output deviations by adding the output deviation DVoxs determined in step 1310 to the existing integrated value SDVoxs of output deviations DVoxs. Subsequently in step 1395, the CPU 71 temporarily ends the routine.

In this manner, the subsidiary feedback control amount vafsfb is determined. The value vafsfb is added to the actual output vabyfs of the upstream-side air-fuel ratio sensor 66 in step 1210 in FIG. 12, and the sum thereof (vabyfs+vafsfb) is converted into a main feedback control-purposed air-fuel ratio abyfs on the basis of a map indicated in FIG. 3 that is stored in the ROM. The main feedback control-purposed air-fuel ratio abyfs computed on the basis of the output Voxs of the downstream-side air-fuel ratio sensor 67 is computed as an air-fuel ratio that is different from the air-fuel ratio vabyfs actually detected by the upstream-side air-fuel ratio sensor 66, by an amount corresponding to the subsidiary feedback control amount vafsfb.

Figure 12:
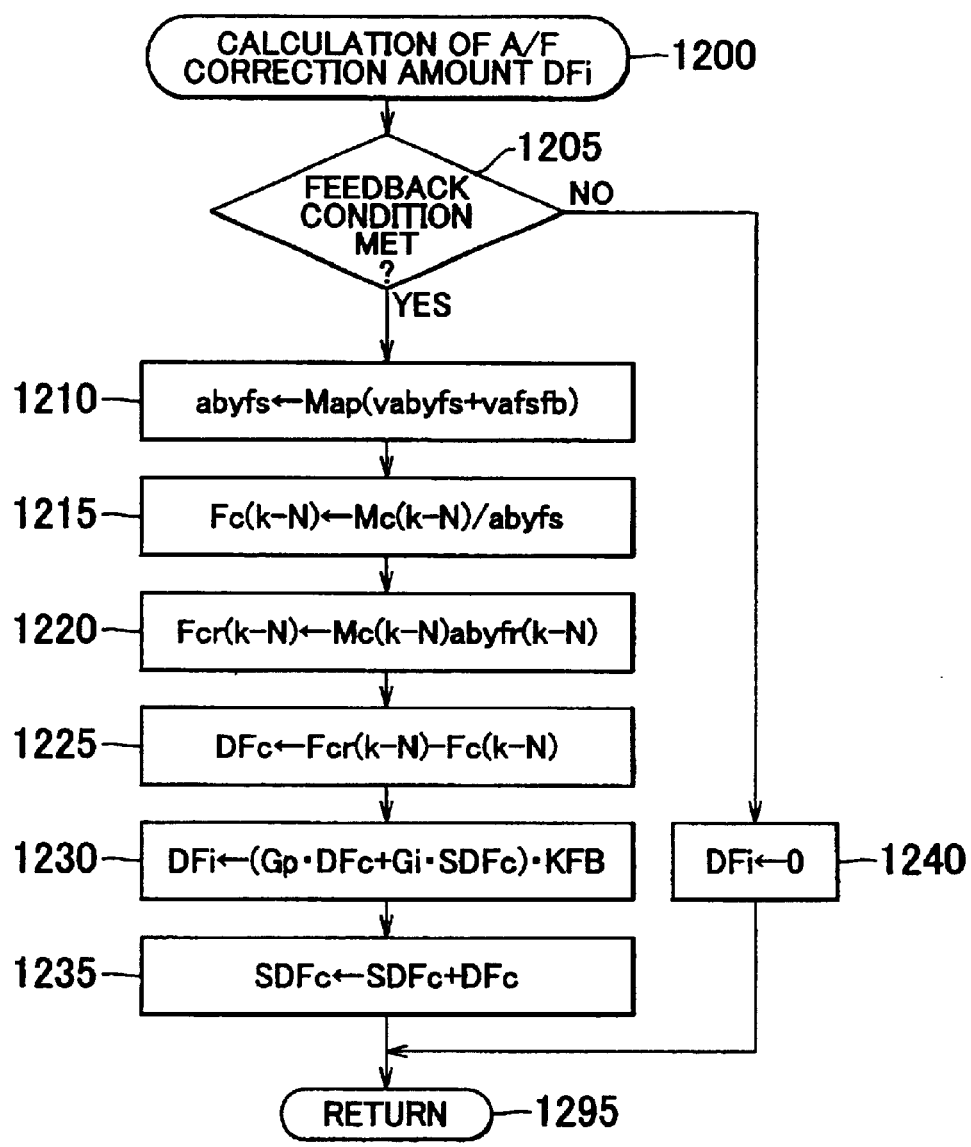
FIG. 12 is a flowchart illustrating a routine for calculating an air-fuel ratio feedback correction amount (main feedback control amount) executed by the CPU shown in FIG. 1.

As a result, the cylinder fuel supply Fc(k−N) calculated in step 1215 in FIG. 12 changes in accordance with the output Voxs of the downstream-side air-fuel ratio sensor 67. Therefore, due to step 1225 and step 1230, the main feedback control amount DFi is changed in accordance with the output Voxs of the downstream-side air-fuel ratio sensor 67. Hence, the engine air-fuel ratio is controlled so that the air-fuel ratio of gas downstream of the first catalyst 53 becomes equal to the air-fuel ratio indicated by the target value Voxref.

If the subsidiary feedback control condition is not met, the CPU 71 makes a determination of "NO" in step 1305, and proceeds to step 1325. In step 1325, the CPU 71 sets the subsidiary feedback control amount vafsfb at "0". Subsequently in step 1395, the CPU 71 temporarily ends the routine. Therefore, the subsidiary feedback control based on the output Voxs of the downstream-side air-fuel ratio sensor 67 is stopped.

(ACTUAL OPERATIONS FOR CALCULATION OF MAXIMUM OXYGEN STORAGE AMOUNT AND DETERMINATION REGARDING CATALYST DEGRADATION) Next described will be actual operations of the apparatus for calculating a maximum oxygen storage amount Cmax of the first catalyst 53 and determination regarding degradation of the first catalyst 53. The CPU 71 is designed to execute a routine for determining whether to start calculating an oxygen storage amount which is illustrated by the flowchart of FIG. 14, at every elapse of a predetermined time.

Figure 14:
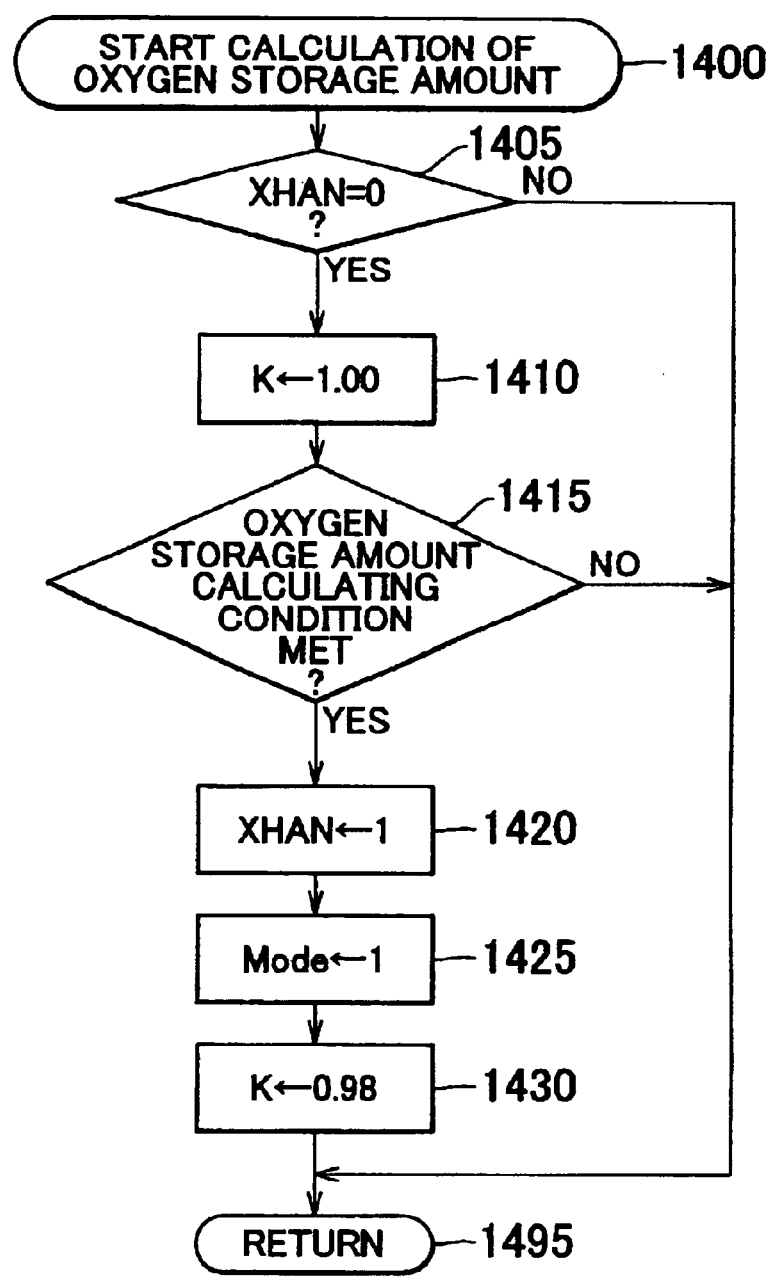
FIG. 14 is a flowchart illustrating a routine of determining whether to start calculation of an oxygen storage amount executed by the CPU shown in FIG. 1.

Therefore, when a predetermined timing arrives, the CPU 71 starts the routine at step 1400 in FIG. 14, and proceeds to step 1405, in which the CPU 71 determines whether the value of the forced air-fuel ratio setting control execution flag XHAN is "0".

Description will be continued on the assumption that the air-fuel ratio control for calculating a maximum oxygen storage amount is not being executed and a maximum oxygen storage amount calculating condition is not met. In that case, the value of the forced air-fuel ratio setting control execution flag XHAN is "0". Therefore, after making a determination of "YES" at step 1405, the CPU 71 proceeds to step 1410, in which the CPU 71 sets the value of an air-fuel ratio setting factor K used in step 1110 in FIG. 11 at "1.00".

Subsequently in step 1415, the CPU 71 determines whether the maximum oxygen storage amount calculating condition is met. The maximum oxygen storage amount calculating condition is fulfilled in a case where the cooling water temperature THW is higher than or equal to a predetermined temperature, and where the vehicle speed acquired via a vehicle speed sensor (not shown) is higher than or equal to a predetermined vehicle speed, and where the amount of change in the throttle valve opening TA per unit time is less than or equal to a predetermined amount, that is, where the engine has been warmed up and is in a steady operation state, and the catalyst has been activated. In addition to these conditions, it is possible to set a condition that the catalyst temperature Tcact be within the temperature range of T1 to T6 indicated in FIG. 7. The catalyst temperature Tcact is determined at every elapse of a predetermined time in the routine illustrated by the flowchart of FIG. 18 described below.

At the present stage, the maximum oxygen storage amount calculating condition is not met as mentioned above. Therefore, the CPU 71 makes a determination of "NO" in step 1415. Subsequently in step 1495, the CPU 71 temporarily ends the routine.

Description will now be made on the assumption that the air-fuel ratio control for calculating a maximum oxygen storage amount has not been executed up to the present time point (i.e., the above-described normal air-fuel ratio control has been executed), and the maximum oxygen storage amount calculating condition is met at the time point. In this case, the CPU 71 makes a determination of "YES" in step 1405, and proceeds to step 1410, in which the CPU 71 sets the value of the air-fuel ratio setting factor K at "1.00". Since the maximum oxygen storage amount calculating condition is met, the CPU 71 makes a determination of "YES" in step 1415, and proceeds to step 1420. In step 1420, the CPU 71 sets the value of the forced air-fuel ratio setting control execution flag XHAN at "1".

Subsequently in step 1425, the CPU 71 sets the value of Mode at "1" in order to enter the first mode. Subsequently in step 1430, the CPU 71 sets the value of the air-fuel ratio setting factor K at "0.98". Then in step 1495, the CPU 71 temporarily ends the routine. As a result, the engine air-fuel ratio is controlled to the aforementioned set lean air-fuel ratio abyfLean that is lean of stoichiometry.

After that, the CPU 71 repeats execution of the routine of FIG. 14 starting at step 1400. Since the value of the forced air-fuel ratio setting control execution flag XHAN is "1", the CPU 71 makes a determination of "NO" in step 1405. Subsequently in step 1495, the CPU 71 temporarily ends the routine.

Figure 15:
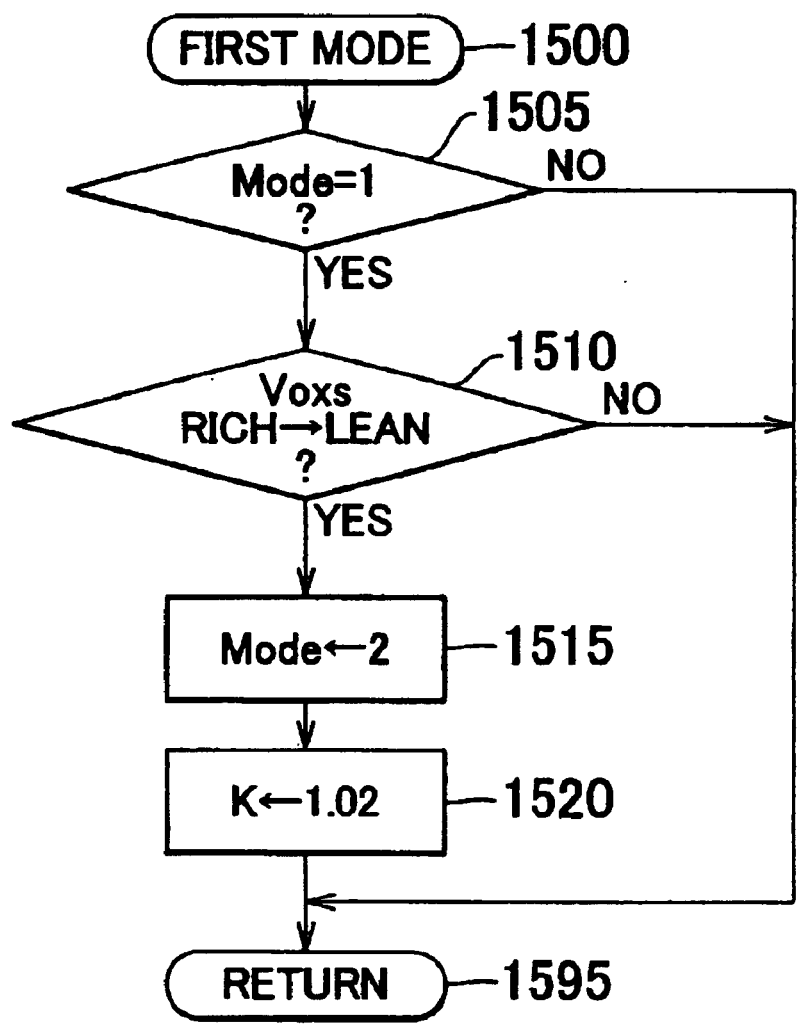
FIG. 15 is a flowchart illustrating a routine of a first mode executed by the CPU shown in FIG. 1.

The CPU 71 also executes a first mode control routine illustrated in FIG. 15, at every elapse of a predetermined time. When a predetermined timing arrives, the CPU 71 starts the routine at step 1500, and proceeds to step 1505, in which the CPU 71 determines whether the value of Mode is "1". In this case, the value of Mode has been set at "1" in step 1425 in FIG. 14. Therefore, in step 1505, the CPU 71 makes a determination of "YES", and proceeds to step 1510. In step 1510, the CPU 71 determines whether the output Voxs of the downstream-side air-fuel ratio sensor 67 has changed from a value indicating an air-fuel ratio rich of stoichiometry to a value indicating an air-fuel ratio lean of stoichiometry.

At the present time, the downstream-side air-fuel ratio sensor output Voxs indicates an air-fuel ratio rich of stoichiometry since the control of bringing the engine air-fuel ratio to the set lean air-fuel ratio abyfLean has just started. Therefore, the CPU 71 makes a determination of "NO" at step 1510, and then temporarily ends the routine in step 1595.

After that, the CPU 71 cyclically executes the process of steps 1500 to 1510 in FIG. 15. Since the air-fuel ratio is controlled approximately to the set lean air-fuel ratio abyfLean, the downstream-side air-fuel ratio sensor output Voxs changes from a rich air-fuel ratio-indicating value to a lean air-fuel ratio-indicating value at the elapse of a certain time, that is, as at the time point t2 in FIG. 5. Therefore, when the CPU 71 proceeds to step 1510, the CPU 71 makes a determination of "YES" at step 1510. Subsequently in step 1515, the CPU 71 sets the value of Mode at "2". Subsequently in step 1520, the CPU 71 sets the value of the air-fuel ratio setting factor K at "1.02". After that, in step 1595, the CPU 71 temporarily ends the routine. As a result, the engine air-fuel ratio is controlled to the aforementioned set rich air-fuel ratio abyfRich that is rich of stoichiometry.

After that, the CPU 71 cyclically executes the routine of FIG. 15 starting at step 1500. Since the value of Mode is "2", the CPU 71 makes a determination of "NO" in step 1505, and immediately proceeds to step 1595, in which the CPU 71 temporarily ends the routine.

Figure 16:
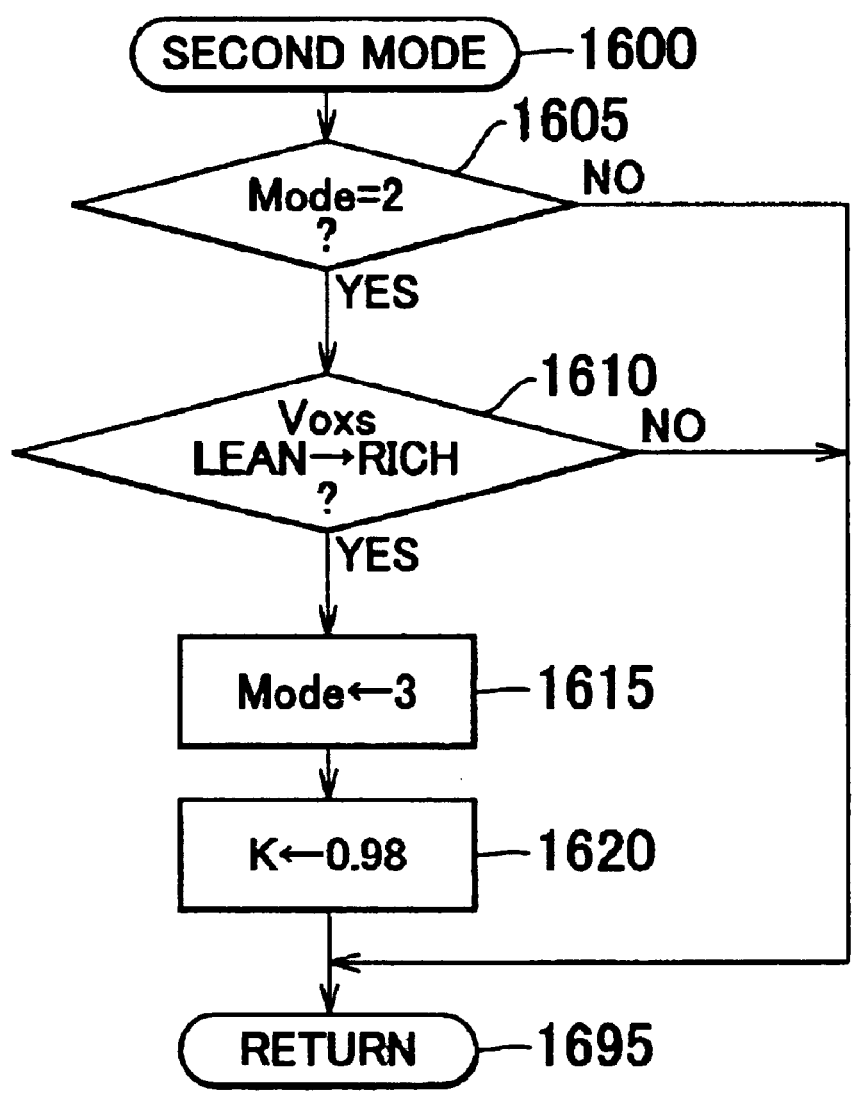
FIG. 16 is a flowchart illustrating a routine of a second mode executed by the CPU shown in FIG. 1.

Similarly, the CPU 71 executes a second mode control routine illustrated in FIG. 16, at every elapse of a predetermined time. When a predetermined timing arrives, the CPU 71 starts the routine at step 1600, and proceeds to step 1605, in which the CPU 71 determines whether the value of Mode is "2". In this case, the value of Mode has been set at "2" in step 1515 in FIG. 15. Therefore, the CPU 71 makes a determination of "YES" in step 1605, and proceeds to step 1610. In step 1610, the CPU 71 determines whether the Voxs of the downstream-side air-fuel ratio sensor 67 has changed from a value indicating an air-fuel ratio lean of stoichiometry to a value indicating an air-fuel ratio rich of stoichiometry. If such a change has not occurred, the CPU 71 proceeds to step 1695, in which the CPU 71 temporarily ends the routine.

Figure 5:
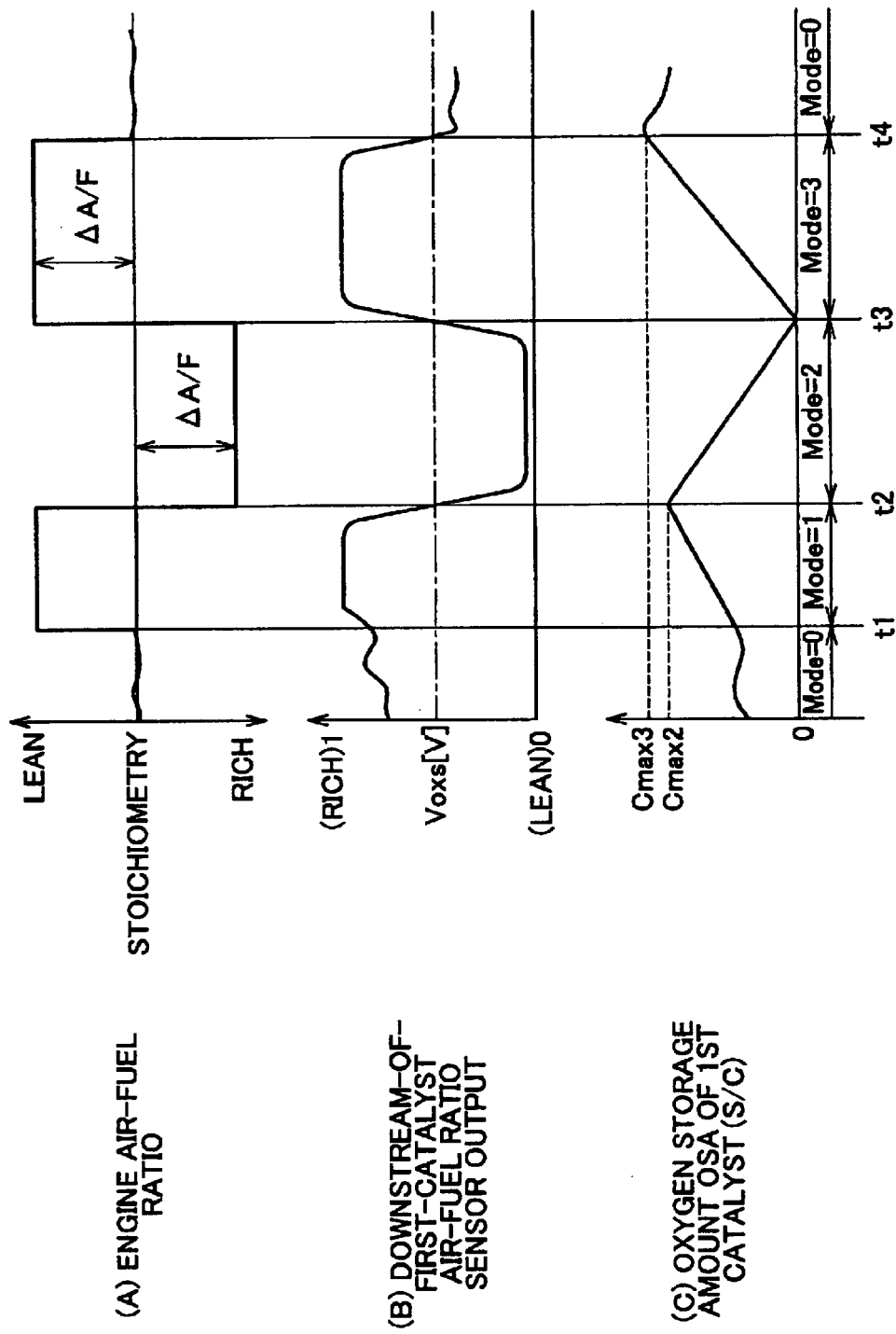
FIG. 5 is a time chart indicating changes in the engine air-fuel ratio, the output of the downstream-of-first catalyst air-fuel ratio, and the oxygen storage amount of the first catalyst shown in FIG. 1, in a case of determination of a maximum oxygen storage amount of the first catalyst.

Then, when the output Voxs of the downstream-side air-fuel ratio sensor 67 changes from a value indicating an air-fuel ratio lean of stoichiometry to a value indicating an air-fuel ratio rich of stoichiometry as indicated at the time point t3 in FIG. 5, the CPU 71 proceeds from step 1610 to step 1615, in which the CPU 71 sets the value of Mode at "3" in order to enter the third mode. Subsequently in step 1620, the CPU 71 sets the value of the air-fuel ratio setting factor K at "0.98". As a result, the engine air-fuel ratio is controlled to the set lean air-fuel ratio abyfLean again as in the case where the value of Mode is "1".

Figure 17:
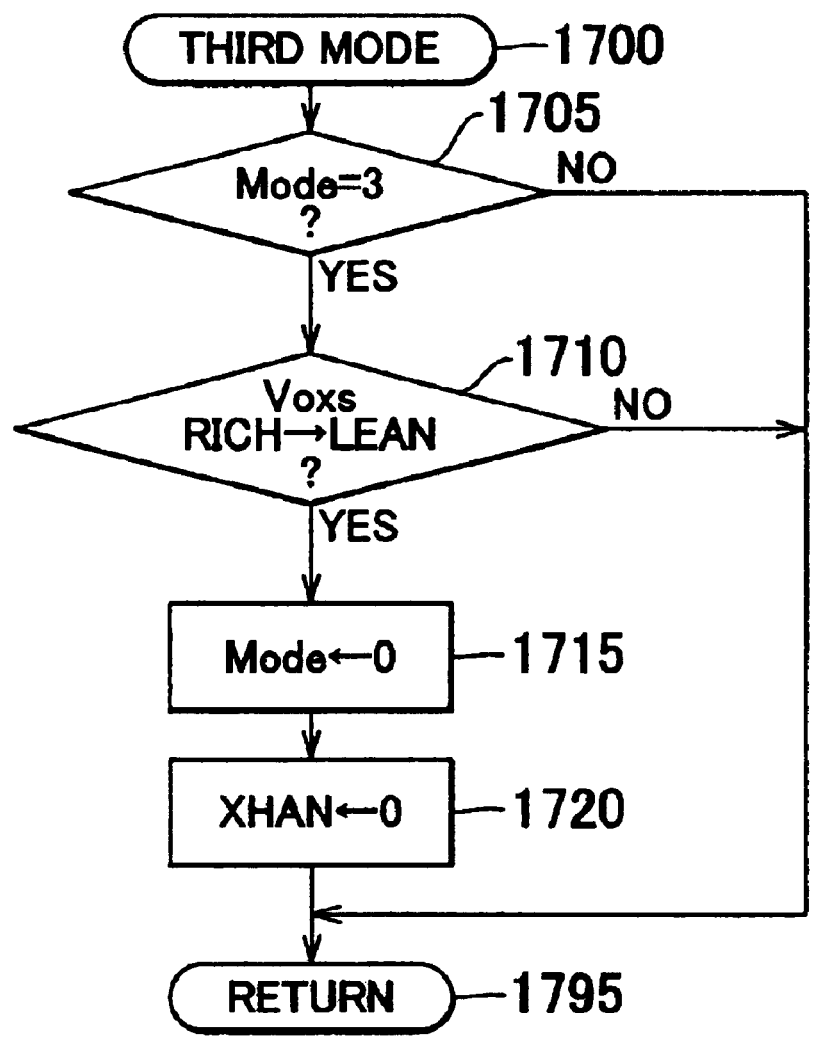
FIG. 17 is a flowchart illustrating a routine of a third mode executed by the CPU shown in FIG. 1.

Furthermore, the CPU 71 executes a third mode control routine illustrated in FIG. 17, at every elapse of a predetermined time. When a predetermined timing arrives, the CPU 71 starts the routine at step 1700, and proceeds to step 1705, in which the CPU 71 determines whether the value of Mode is "3". In this case, the value of Mode has been set at "3" in step 1215 in FIG. 12. Therefore, the CPU 71 makes a determination of "YES" in step 1705, and proceeds to step 1710. In step 1710, the CPU 71 monitors whether the output Voxs of the downstream-side air-fuel ratio sensor 67 has changed from a value indicating an air-fuel ratio rich of stoichiometry to a value indicating an air-fuel ratio lean of stoichiometry.

Then, when the output Voxs of the downstream-side air-fuel ratio sensor 67 changes from a value indicating an air-fuel ratio rich of stoichiometry to a value indicating an air-fuel ratio lean of stoichiometry as indicated at the time point t4 in FIG. 5, the CPU 71 proceeds from step 1710 to step 1715, in which the CPU 71 sets the value of Mode at "0". Subsequently in step 1702, the CPU 71 sets the value of the forced air-fuel ratio setting control execution flag XHAN at "0". Subsequently in step 1795, the CPU 71 temporarily ends the routine.

As a result, during execution of the routine of FIG. 14, the CPU 71 makes a determination of "YES" in step 1405, and proceeds to step 1410. Therefore, the value of the air-fuel ratio setting factor K is set back to "1.00". Furthermore, since the value of the forced air-fuel ratio setting control execution flag XHAN has been set back to "0", the CPU 71 makes a determination of "YES" at step 1205 in FIG. 12 and at step 1305 in FIG. 13 provided that the main feedback control condition and the subsidiary feedback control condition are met. In that case, therefore, the main feedback control and the subsidiary feedback control are started again, whereby the air-fuel ratio is feedback-controlled to the stoichiometric air-fuel ratio.

As described above, if the maximum oxygen storage amount calculating condition is met, the engine air-fuel ratio is sequentially controlled to the set lean air-fuel ratio abyfLean, the set rich air-fuel ratio abyfRich, and the set lean air-fuel ratio abyfLean.

Figure 18:
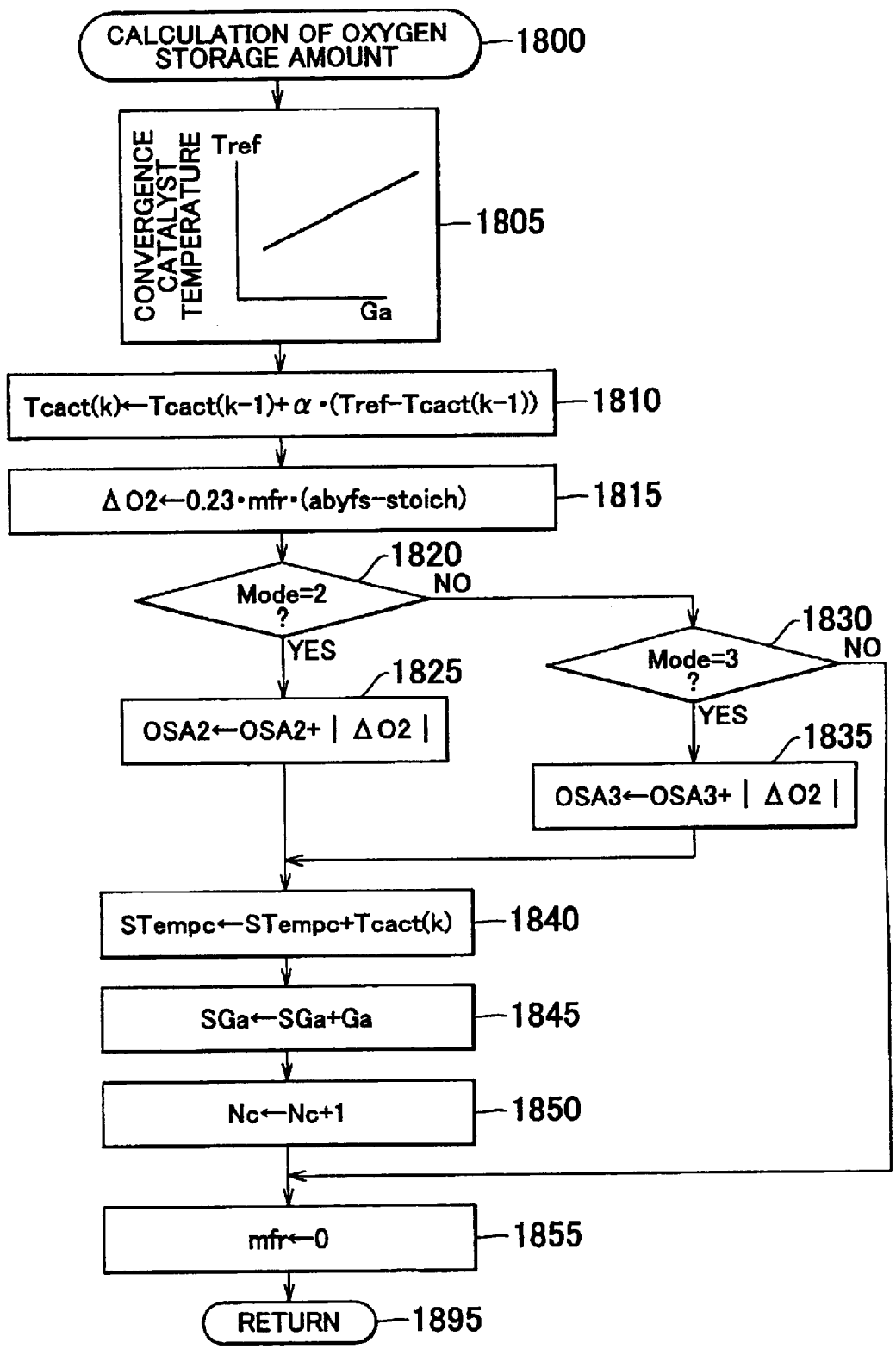
FIG. 18 is a flowchart illustrating a routine for calculating an oxygen storage amount of the first catalyst executed by the CPU shown in FIG. 1.

The CPU 71 is also designed to execute a routine for calculating a maximum oxygen storage amount Cmax of the first catalyst 53 which is illustrated by the flowchart of FIG. 18, at every elapse of a predetermined time. When a predetermined timing arrives, the CPU 71 starts the routine at step 1800 in FIG. 18. Subsequently in steps 1805 and 1810, the CPU 71 estimates a temperature Tcact of the first catalyst 53.

Specifically, a relationship between the intake air flow Ga and the convergence catalyst temperature Tref is stored as a map in the ROM 72. On the basis of the present-time actual intake air flow Ga and the map, the CPU 71 computes a present-time convergence catalyst temperature Tref. The convergence catalyst temperature Tref is a temperature to which the temperature of the first catalyst 53 converges when an operation state of the intake air flow Ga continues.

Subsequently in step 1810, the CPU 71 computes a present catalyst temperature Tcact(k) as in mathematical expression 9. In mathematical expression 9, Tact(k−1) is the catalyst temperature Tcact(k) computed at the time of the previous execution of the routine, and a is a predetermined constant ranging from 0 to 1 (e.g., 0.003).

$$Tcact(k) = Tact(k-1) + \alpha \cdot ((Tref - Tcact(k-1))) \qquad [\text{Math. 9}]$$

Subsequently in step 1815, the CPU 71 determines an oxygen storage change ΔO2.

$$\Delta O2 = 0.23 \cdot mfr \cdot (abyfs - \text{stoich}) \qquad [\text{Math. 10}]$$

Then, the CPU 71 proceeds to step 1820, in which the CPU 71 determines whether the value of Mode "2". If the value of Mode is "2", the CPU 71 makes a determination of "YES" in step 1820, and proceeds to step 1825. In step 1825, the CPU 71 sets a value obtained by adding the absolute value of the oxygen storage change ΔO2 to the present-time oxygen storage amount OSA2 of the second mode, as a new oxygen storage amount OSA2. Subsequently, the CPU 71 proceeds to step 1840. Conversely, if the CPU 71 makes a determination of "NO" in step 1820, the CPU 71 proceeds to step 1830, in which the CPU 71 determines whether the value of Mode is "3". If the value of Mode is "3", the CPU 71 makes a determination of "YES" in step 1830, and proceeds to step 1835. In step 1835, the CPU 71 sets a value obtained by adding the absolute value of the oxygen storage change ΔO2 to the present-time oxygen storage amount OSA3 of the third mode, as a new oxygen storage amount OSA3. Subsequently, the CPU 71 proceeds to step 1840.

In step 1840, the CPU 71 computes a new accumulated catalyst temperature value STempc by adding the catalyst temperature Tcact(k) determined in step 1810 to the present-time accumulated catalyst temperature value STempc. Subsequently in step 1845, the CPU 71 computes a new accumulated intake air flow value SGa by adding the present-time intake air flow Ga to the present-time accumulated intake air flow value SGa. Subsequently in step 1850, the CPU 71 increments the value of a counter Nc by "1". The value of the counter Nc indicates the number of data regarding the catalyst temperature Tcact (k) and the intake air flow Ga added into the accumulated catalyst temperature value STempc and the accumulated intake air flow value SGa, respectively. After that, in step 1855, the CPU 71 sets the total mfr of fuel injection amount Fi at "0". Subsequently in step 1895, the CPU 71 temporarily ends the routine.

Due to cyclical execution of the above-described processes, the CPU 71 computes the catalyst temperature Tcact in step 1810 at every elapse of a predetermined time, and the CPU 71 computes the oxygen storage amount OSA2 and the oxygen storage amount OSA3 of the first catalyst 53 in the second mode (Mode=2) in which the air-fuel ratio of gas upstream of the first catalyst 53 is controlled to the set rich air-fuel ratio abyfRich, and the third mode (Mode=3) in which the air-fuel ratio of gas upstream of the first catalyst 53 is controlled to the set lean air-fuel ratio abyfLean. If the present operation is not in either the second mode or the third mode, the CPU 71 executes steps 1800 to 1820, step 1830 and step 1855, and then proceeds to step 1895, in which the CPU 71 temporarily ends the routine.

Next described will be operations of the apparatus for storage of the maximum oxygen storage amount Cmax, determination regarding catalyst degradation using the maximum oxygen storage amount Cmax, and the learning of the gradient Ka.

In this apparatus, the actual maximum oxygen storage amounts CmaxR are stored into n number of storage areas specified by predetermined addresses DR1 to DRn in the RAM 73 (hereinafter, simply referred to as "storage areas of addresses DR1 to DRn"). Furthermore, the actual maximum oxygen storage amounts CmaxR for updating the gradient (learned value) Ka calculated under a predetermined condition described below are stored into n number of storage areas specified by predetermined addresses DBR1 to DBRn in the backup RAM 74 (hereinafter, simply referred to as "storage areas of addresses DBR1 to DBRn"). Similarly, the gradient Ka updated on the basis of the aforementioned data, and a catalyst degradation determination flag XREKA that indicates a result of determination regarding catalyst degradation are stored in storage areas specified by predetermined addresses in the backup RAM 74.

Furthermore, the data regarding the actual maximum oxygen storage amounts CmaxR are stored in the storage areas together with the calculation period catalyst temperatures Tave, that is, the mean values of the catalyst temperatures Tcact at the time of calculation of the data regarding the actual maximum oxygen storage amounts CmaxR (mean values of catalyst temperatures during the period of the second mode and the third mode), and the calculation period intake air flows Gaave, that is, the mean values of the intake air flows Ga at the time of calculation of the data regarding the maximum oxygen storage amounts Cmax (mean values of the intake air flows Ga during the period of the second mode and the third mode). That is, sets of data (CmaxR, Tave, Gaave) are stored into the storage areas of addresses DR1 to DRn, and are also stored into the storage areas of addresses DBR1 to DBRn in some cases. Hereinafter, each set of data will be referred to as data regarding the actual maximum oxygen storage amount CmaxR and the like, in some cases.

First, description will be started with a case in which operation of the engine 10 is started in a state where actual maximum oxygen storage amounts CmaxR have not been obtained because, for example, the vehicle is fresh from a factory, and therefore no data regarding actual maximum oxygen storage amounts CmaxR and the like are stored in the storage areas of addresses DBR1 to DBRn in the backup RAM 74, or a state where no data regarding actual maximum oxygen storage amounts CmaxR and the like are stored in the storage areas of addresses DBR1 to DBRn due to destruction of the data stored in the storage areas of addresses DBR1 to DBRn, after discontinuation of electric power supply to the electric control unit 70 caused by removal of the battery. In this case, the learning of the gradient Ka has not been completed, and therefore the value of a learning completion flag XGAKU stored in the backup RAM 74 is set at "0" as described below.

Figure 19:
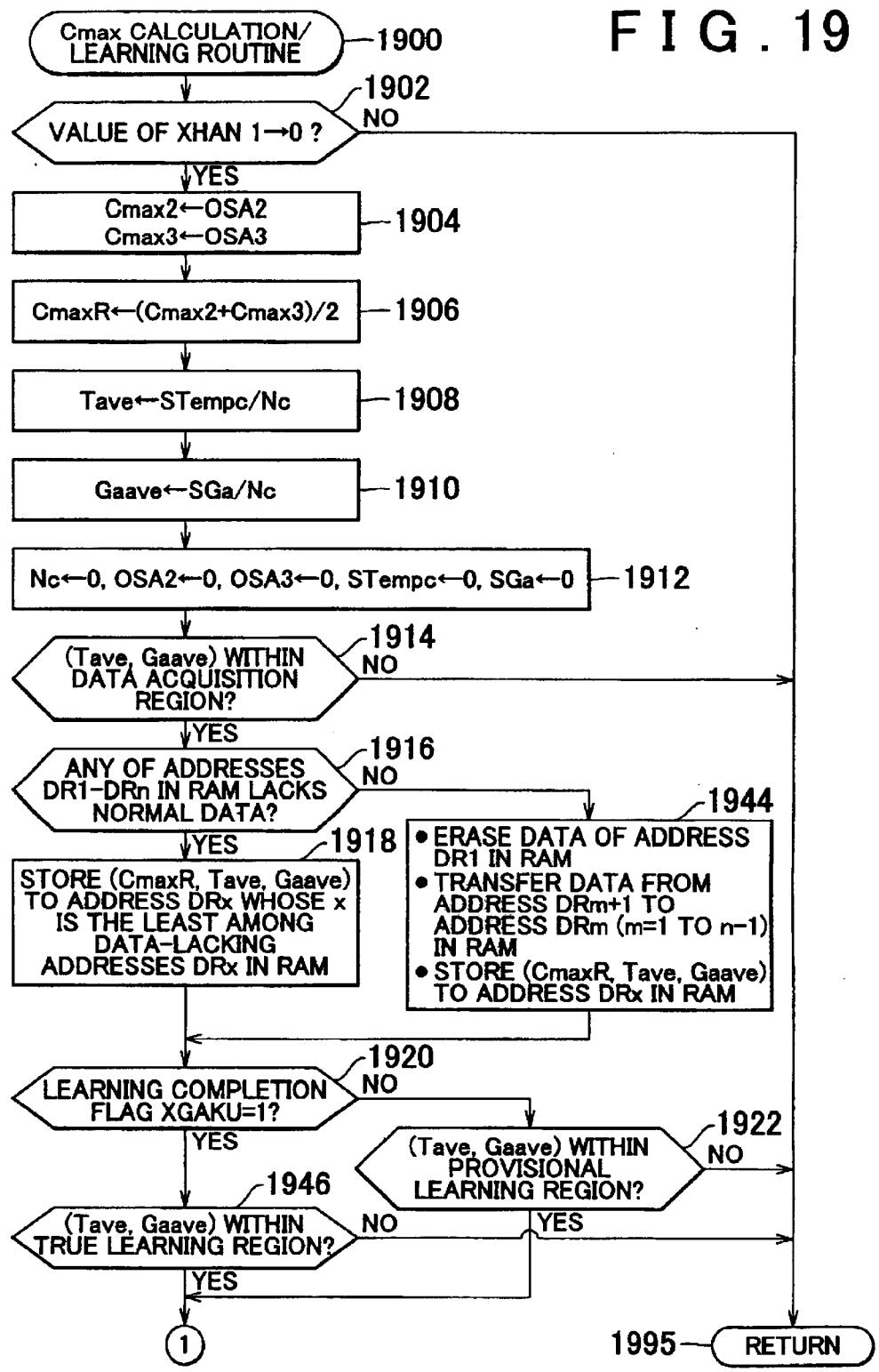
FIG. 19 is a flowchart illustrating a first half portion of a routine executed by the CPU shown in FIG. 1 to calculate a maximum oxygen storage amount and learn a characteristic value of the catalyst (gradient)
Figure 20:
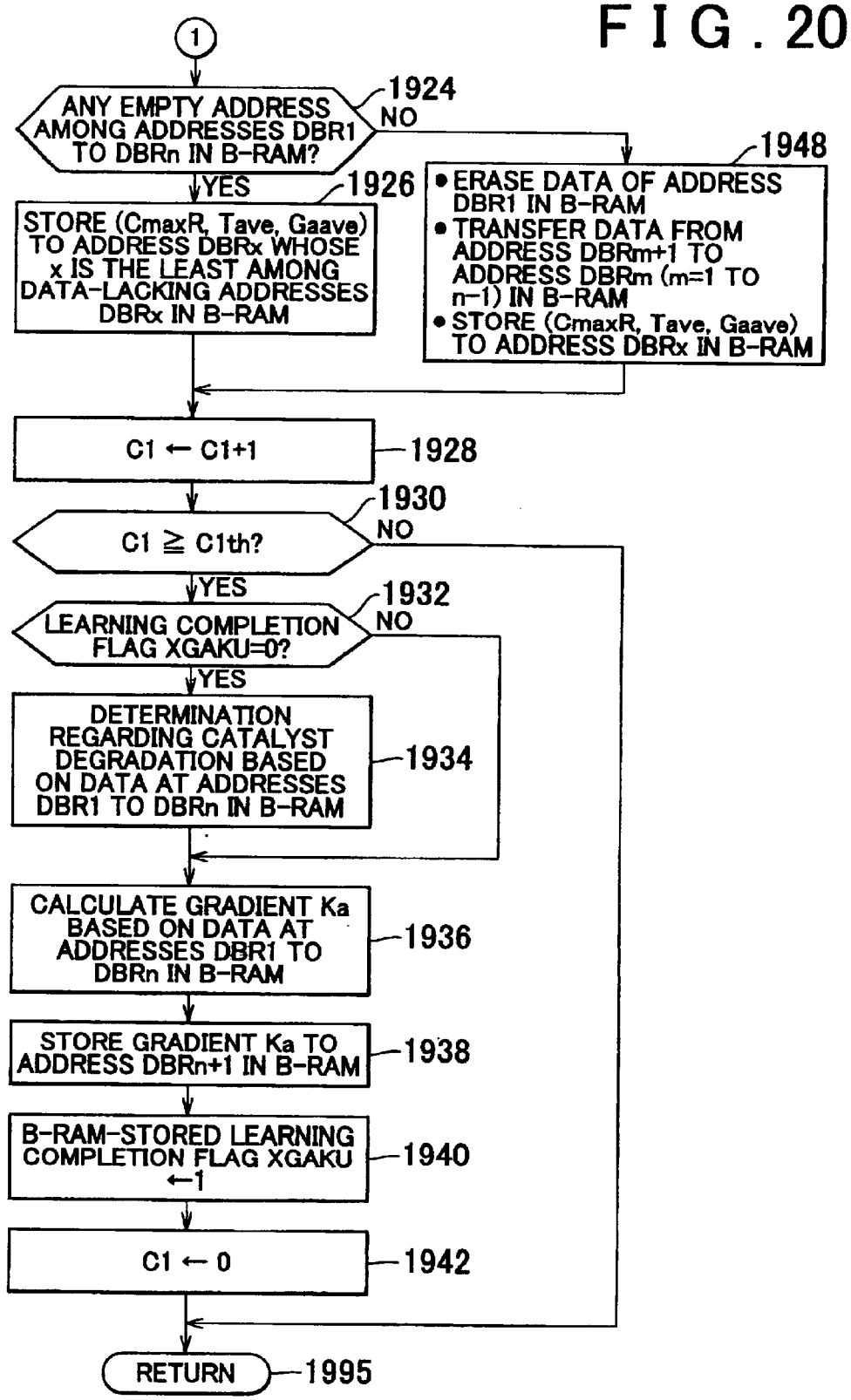
FIG. 20 is a flowchart illustrating a second half portion of the routine executed by the CPU shown in FIG. 1 to calculate a maximum oxygen storage amount and learn a characteristic value of the catalyst (gradient)

The CPU 71 is designed to execute a routine for calculating a maximum oxygen storage amount Cmax and learning a gradient Ka which is illustrated in FIGS. 19 and 20, at every elapse of a predetermined time. When a predetermined timing arrives, the CPU 71 starts the routine at step 1900, and proceeds to step 1902, in which the CPU 71 monitors whether the value of the forced air-fuel ratio setting control execution flag XHAN has changed from "1" to "0". If it is presently not the case that the third mode has just ended (i.e., if it is presently not the case that the value of the forced air-fuel ratio setting control execution flag XHAN has just been changed to "0" in step 1720 in FIG. 17), the CPU 71 makes a determination of "NO" in step 1902, and proceeds to step 1995, in which the CPU 71 temporarily ends the routine.

As the operation continues, the controls of the first to third modes are executed. When the control of the third mode ends and the value of the forced air-fuel ratio setting control execution flag XHAN is changed from "1" to "0", the CPU 71 makes a determination of "YES" in step 1902, and proceeds to step 1904. In step 1904, the CPU 71 stores the present-time oxygen storage amount OSA2 and the present-time oxygen storage amount OSA3 as maximum oxygen storage amounts Cmax2, Cmax3, respectively. Subsequently in step 1906, the CPU 71 calculates a mean value of the maximum oxygen storage amount Cmax2 and the maximum oxygen storage amount Cmax3, and stores the mean value as an actual maximum oxygen storage amount CmaxR of the first catalyst 53.

Subsequently in step 1908, the CPU 71 computes a calculation period catalyst temperature Tave by dividing the accumulated catalyst temperature value STempc by the value of the counter Nc. Subsequently in step 1910, the CPU 71 computes a calculation period intake air flow Gaave by dividing the accumulated intake air flow value SGa by the value of the counter Nc. Then, in step 1912, the CPU 71 sets the values of the counter Nc, the oxygen storage amount OSA2, the oxygen storage amount OSA3, the accumulated catalyst temperature value STempc, and the accumulated intake air flow value SGa at "0".

Subsequently in step 1914, the CPU 71 determines whether the calculation period catalyst temperature Tave ad the calculation period intake air flow Gaave are within a normal operation region (data acquisition region) indicated as a region A in FIG. 21. If the calculation period catalyst temperature Tave and the calculation period intake air flow Gaave are outside the region A, the CPU 71 proceeds to step

1995, in which the CPU 71 temporarily ends the routine. That is, the presently obtained actual maximum oxygen storage amount CmaxR is with low reliability, and cannot be used for determination regarding catalyst degradation. Therefore, the presently obtained actual maximum oxygen storage amount CmaxR is not stored in either the RAM 73 or the backup RAM 74.

If the answer to step 1914 is "YES", the CPU 71 proceeds to step 1916, in which the CPU 71 determines whether there is any storage area among the storage areas of addresses DR1 to DRn in the RAM 73 that does not store data regarding the maximum oxygen storage amount Cmax and the like.

At the present stage, an actual maximum oxygen storage amount CmaxR has been acquired for the first time following a startup of the engine 10. Therefore, at the present, none of the storage areas of addresses DR1 to DRn stores data regarding the maximum oxygen storage amount Cmax and the like. Hence, the CPU 71 makes a determination of "YES" in step 1916, and proceeds to step 1918. In step 1918, the CPU 71 stores the data regarding the actual maximum oxygen storage amount CmaxR and the like computed in steps 1906 to 1910, that is, the actual maximum oxygen storage amount CmaxR, the calculation period catalyst temperature Tave and the calculation period intake air flow Gaave, into the data area of an address DRx (x is an integer of 1 to n) whose "x" is the least (in this case, DR1) among the addresses where data regarding the actual maximum oxygen storage amount CmaxR and the like are not stored.

Subsequently in step 1920, the CPU 71 determines whether the value of the learning completion flag XGAKU is "1". In the present case, the value of the learning completion flag XGAKU is "0". Therefore, the CPU 71 makes a determination of "NO" in step 1920, and proceeds to step 1922. In step 1922, the CPU 71 determines whether the calculation period catalyst temperature Tave and the calculation period intake air flow Gaave are within a provisional learning region indicated as a region B in FIG. 21. If the calculation period catalyst temperature Tave and the calculation period intake air flow Gaave are not within the region B, the CPU 71 proceeds from step 1922 to step 1995, in which the routine temporarily ends. That is, in this case, data regarding the actual maximum oxygen storage amount CmaxR and the like are not stored into the backup RAM 74.

Conversely, if the answer to step 1922 is "YES", the CPU 71 proceeds to step 1924 in FIG. 20, in which the CPU 71 determines whether there is any storage area among the storage areas of addresses DBR1 to DBRn in the backup RAM 74 that does not store data regarding the actual maximum oxygen storage amount CmaxR and the like.

As mentioned above, at the present stage, none of the storage areas of addresses DBR1 to DBRn stores data regarding the actual maximum oxygen storage amount CmaxR and the like. Therefore, the CPU 71 makes a determination of "YES" in step 1924, and proceeds to step 1926. In step 1926, the CPU 71 stores the actual maximum oxygen storage amount CmaxR, the calculation period catalyst temperature Tave and the calculation period intake air flow Gaave computed in steps 1906 to 1910, into the data area of an address DBRx (x is an integer of 1 to n) whose "x" is the least (in this case, DBR1) among the addresses where data regarding the actual maximum oxygen storage amount CmaxR and the like are not stored.

Subsequently in step 1928, the CPU 71 increments the value of a number-of-times-of-data acquisition counter C1 stored in the backup RAM 74 by "1". Subsequently in step 1930, the CPU 71 determines whether the value of the counter C1 has become equal to or greater than a predetermined value C1th that is equal to "n (>2)". The value of the counter C1 is reset to "0" at the time of shipment from a factory and the time of restart of power supply from a battery. Therefore, the value of the counter C1 at the present time is "1", and is less than the predetermined value C1th. Therefore, the CPU 71 makes a determination of "NO" in step 1930, and proceeds to step 1995, in which the routine temporarily ends. Hence, at the present time, neither the learning of a gradient Ka nor the determination regarding catalyst degradation is executed.

After that, every time an actual maximum oxygen storage amount CmaxR is computed within the provisional learning region (region B in FIG. 21), the CPU 71 executes step 1918 and step 1926, so that a set of data, including the actual maximum oxygen storage amount CmaxR, is stored at an address DRx and an address DRBx. Furthermore, due to execution of step 1928, the value of the counter C1 increases by "1" at a time.

When an actual maximum oxygen storage amount CmaxR has been computed within the provisional learning region the C1th number of times, the CPU 71 makes a determination of "YES" in step 1930, and proceeds to step 1932. In step 1932, the CPU 71 determines whether the value of the learning completion flag XGAKU is "0".

At this stage, the value of the learning completion flag XGAKU is still "0". Therefore, the CPU 71 makes a determination of "YES" in step 1932, and proceeds to step 1934. In step 1934, the CPU 71 determines whether a mean value of the n number of data of the actual maximum oxygen storage amount CmaxR acquired within the provisional learning region and stored in the storage areas of addresses DBR1 to DBRn in the backup RAM 74 is greater than the catalyst degradation criterion value Cmaxth. If the mean value is greater than the catalyst degradation criterion value Cmaxth, the CPU 71 determines that the catalyst is normal, and sets the value of the catalyst degradation determination flag XREKA at "0". If the mean value is less than the catalyst degradation criterion value Cmaxth, the CPU 71 determines that the catalyst has degraded, and sets the value of the catalyst degradation determination flag XREKA at "1".

The catalyst degradation criterion value Cmaxth used for determination regarding catalyst degradation in step 1934 is determined on the basis of a mean value of the calculation period intake air flows Gaave stored in the storage areas of addresses DBR1 to DBRn in the backup RAM 74, and the threshold value (catalyst degradation criterion value) determining map stored in the ROM 72. In this manner, determination regarding catalyst degradation can be performed free from dependency of the maximum oxygen storage amount Cmax on the intake air flow Ga (the amount of gas inflow to the first catalyst 53).

Subsequently in step 1936, the CPU 71 determines a gradient Ka on the basis of the mean value of the n number of data regarding the actual maximum oxygen storage amount CmaxR stored in the storage areas of addresses DBR1 to DBRn in the backup RAM 74, a mean value of the n number of data regarding the calculation period catalyst temperature Tave stored in the aforementioned storage areas, and the gradient determining map stored in the ROM 72. Subsequently in step 1938, the CPU 71 stores the determined gradient Ka into the storage area specified by the address DBRn+k in the backup RAM 74.

After that, the CPU 71 executes steps 1940 and 1942, in which the values of the learning completion flag XGAKU and the counter C1 stored at predetermined addresses in the backup RAM 74 are set at "1" and "0", respectively. Subsequently in step 1995, the CPU 71 temporarily ends the routine. As described above, if a gradient Ka has not been acquired, a gradient Ka is provisionally learned on the basis of the n number of data regarding the actual maximum oxygen storage amount CmaxR and the like acquired in the provisional learning region, and each of the n number of actual maximum oxygen storage amounts CmaxR is used for determination regarding catalyst degradation without being normalized.

From then on, if an actual maximum oxygen storage amount CmaxR is computed within the normal operation region (region A in FIG. 21), the CPU 71 makes a determination of "YES" in step 1914, and proceeds to step 1916. At this time point, data of the maximum oxygen storage amount Cmax have been stored in all the storage areas of the addresses DR1 to DRn. Therefore, the CPU 71 makes a determination of "NO" in step 1916, and proceeds to step 1944. In step 1944, the CPU 71 erases the data of the address DR1, and sequentially transfers data from the address DRm+1 to the address DRm (m=1 to n−1), and stores a set of data (CmaxR, Tave, Gaave) determined in step 1904 to 1910 at the address DRn. After that, the CPU 71 proceeds to step 1920.

Furthermore, since the value of the learning completion flag XGAKU has been set at "1" in step 1940, the CPU 71 makes a determination of "YES" in step 1920, and proceeds to step 1946. In step 1946, the CPU 71 determines whether the calculation period catalyst temperature Tave and the calculation period intake air flow Gaave are within the true learning region indicated as a region C in FIG. 21. If the calculation period catalyst temperature Tave and the calculation period intake air flow Gaave are not within the region C, the CPU 71 proceeds from step 1946 to step 1995, in which the routine temporarily ends. As a result, the data at DR1 to DRn in the RAM 73 are updated, but the data at DBR1 to DBRn in the backup RAM 74 are not updated.

If the CPU 71 makes a determination of "YES" in step 1946, that is, if the present actual maximum oxygen storage amount CmaxR is an amount acquired within the true learning region, the answer of "YES" to step 1946 is followed by step 1924 in FIG. 20. In this case, since data regarding the actual maximum oxygen storage amount CmaxR and the like has been stored in each of the storage areas of addresses DBR1 to DBRn in the backup RAM 74, the CPU 71 makes a determination of "NO" in step 1924, and proceeds from step 1948. In step 1948, the CPU 71 erases the data at the address DBR1 in the backup RAM 74, and sequentially transfers data from the address DBRm+1 to the address DBRm (m=1 to n−1), and stores a set of data (CmaxR, Tave, Gaave) determined in step 1904 to 1910 at the address DBRn.

Thus, if the presently acquired actual maximum oxygen storage amount CmaxR is an amount CmaxR acquired in the true learning region (region C), the actual maximum oxygen storage amount CmaxR is considered sufficiently reliable to perform the learning of a gradient Ka, and is stored into the backup RAM 74.

Subsequently, the CPU 71 executes steps 1928 and 1930. Since the value of the counter C1 is "1" at the present stage, the CPU 71 makes a determination of "NO" in step 1930, and proceeds to step 1995, in which the routine temporarily ends.

After that, every time an actual maximum oxygen storage amount CmaxR is acquired within the true learning region, the CPU 71 executes step 1948, in which data at the addresses DBR1 to DBRn are updated. When an actual maximum oxygen storage amount CmaxR has been acquired within the true learning region the C1th (=n) number of times, the CPU 71 makes a determination of "YES" in step 1930, and proceeds to step 1932. In this case, since the value of the learning completion flag XGAKU is "1", the CPU 71 makes a determination of "NO" in step 1932, and proceeds to steps 1936 to 1942 without executing step 1934.

Then, in step 1936, a gradient Ka is determined on the basis of the mean value of the n number of actual maximum oxygen storage amounts CmaxR acquired within the true learning region, and the mean value of the n number of calculation period catalyst temperatures Tave, and the gradient determining map stored in the ROM 72. Subsequently in step 1938, the gradient Ka is stored into the storage area of DBRn+k in the backup RAM 74. That is, the gradient Ka is updated and learned.

Thus, after the learning of a gradient Ka has been completed, an acquired actual maximum oxygen storage amount CmaxR, if acquired within the true learning region, is used to update the data stored at the addresses DR1 to DRn in the RAM 73, and the data stored at the addresses DBR1 to DBRn in the backup RAM 74. When C1th (=n) number of such actual maximum oxygen storage amounts CmaxR have been acquired, the update and learning of the gradient Ka is performed. If an actual maximum oxygen storage amount CmaxR is acquired outside the true learning area but within the normal operation region, the actual maximum oxygen storage amount CmaxR is used to update only the data stored at the addresses DR1 to DRn in the RAM 73.

Figure 22:
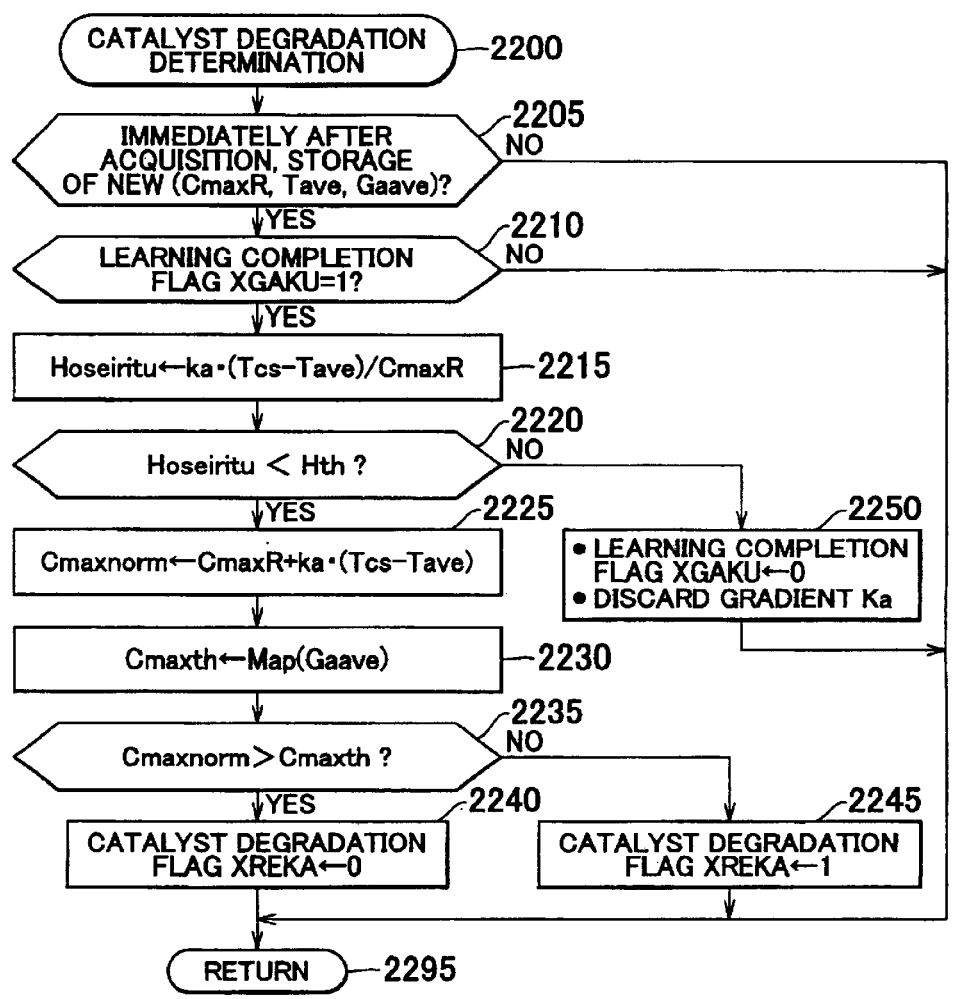
FIG. 22 is a flowchart illustrating a routine for making determination regarding catalyst degradation executed by the CPU shown in FIG. 1.

The CPU 71 is also designed to cyclically execute a routine for normal determination regarding catalyst degradation illustrated by the flowchart of FIG. 22, at every elapse of a predetermined time. When a predetermined timing arrives, the CPU 71 starts the routine at step 2200, and proceeds to step 2205, in which the CPU 71 determines whether a new set of data (CmaxR, Tave, Gaave) has just been stored at the address DRn in the RAM 73 (i.e., whether step in FIG. 19 has just been executed).

Description will be continued on the assumption that a value of gradient Ka has been acquired and therefore the value of the learning completion flag XGAKU is "1", and a set of data (CmaxR, Tave, Gaave) has just been stored at the address DRn in the RAM 73, and that the gradient Ka is appropriate and the correction factor Hoseiritu is less than a correction abnormality criterion value Hth. In that case, the CPU 71 makes a determination of "YES" in step 2205, and proceeds to step 2210, in which the CPU 71 determines whether the value of the learning completion flag XGAKU is "1".

In this case, the value of the learning completion flag XGAKU has been set at "1". Therefore, the CPU 71 makes a determination of "YES" in step 2210, and proceeds to step 2215. In step 2215, the CPU 71 calculates a correction factor Hoseiritu on the basis of the new actual maximum oxygen storage amount CmaxR stored at the address DRn in step 2215 and the aforementioned mathematical expression 6. Subsequently in step 2220, the CPU 71 determines whether the correction factor Hoseiritu is less than the correction abnormality criterion value Hth. That is, in step 2220, the CPU 71 determines whether the gradient Ka is appropriate and the actual maximum oxygen storage amount CmaxR will be appropriately normalized and corrected.

In this case, on the aforementioned assumption, the gradient Ka is appropriate, and the correction factor Hoseiritu is less than the correction abnormality criterion value Hth. Therefore, the CPU 71 makes a determination of "YES" in step 2220, and proceeds to step 2225. In step 2225, the CPU 71 computes a post-normalization maximum oxygen storage amount Cmaxnorm by correcting and normalizing the actual maximum oxygen storage amount CmaxR on the basis of the new actual maximum oxygen storage amount CmaxR stored at the address DRn and the aforementioned mathematical expression 5. Subsequently in step 2230, the CPU 71 computes a catalyst degradation criterion value Cmaxth on the basis of the calculation period intake air flow Gaave and the threshold value determining map. Subsequently in step 2235, the CPU 71 determines whether the catalyst has degraded on the basis of determination as to whether the post-normalization maximum oxygen storage amount Cmaxnorm is greater than the catalyst degradation criterion value Cmaxth.

If the post-normalization maximum oxygen storage amount Cmaxnorm is greater than the catalyst degradation criterion value Cmaxth, the CPU 71 determines that the first catalyst 53 has not degraded, and proceeds to step 2240. In step 2240, the CPU 71 sets the value of the catalyst degradation determination flag XREKA at "0". Subsequently in step 2295, the CPU 71 temporarily ends the routine. Conversely, if it is determined in step 2235 that the post-normalization maximum oxygen storage amount Cmaxnorm is less than or equal to the catalyst degradation criterion value Cmaxth, the CPU 71 determines that the first catalyst 53 has degraded, and proceeds to step 2245. In step 2245, the CPU 71 sets the value of the catalyst degradation determination flag XREKA at "1". Subsequently in step 2295, the CPU 71 temporarily ends the routine.

Thus, if a gradient Ka has been learned as an appropriate value, the following operation is performed. That is, every time an actual maximum oxygen storage amount CmaxR is acquired within the normal operation region indicated by the region A in FIG. 21, the actual maximum oxygen storage amount CmaxR is normalized, and the thus-obtained post-normalization maximum oxygen storage amount Cmaxnorm is used as a basis for the determination regarding catalyst degradation.

Next description will be made regarding a case where the catalyst is damaged by misfire, or the catalyst has received physical damage due to impact or the like, and the value of gradient Ka, that is, the state of degradation of the catalyst, has sharply and considerably changed from the state of degradation occurring at the time of learning the gradient Ka. In this case, the correction factor Hoseiritu becomes greater than the correction abnormality criterion value Hth. Therefore, the CPU 71, when proceeding to step 2220 via steps 2200 to 2215 in FIG. 22, makes a determination of "NO" in step 2220, and proceeds to step 2250. In step 2250, the CPU 71 sets the value of the learning completion flag XGAKU at "0", and discards (clears) the value of gradient Ka stored at the address DBRn+k in the backup RAM 74. After that, without executing determination regarding catalyst degradation, the CPU 71 proceeds to step 2295, in which the routine temporarily ends. Due to above-described operation, it is possible to avoid a false determination regarding catalyst degradation based on false normalization.

If a determination of "NO" is made in step 2205 or step 2210, the CPU 71 immediately proceeds to step 2295, in which the routine temporarily ends. Therefore, if it is presently not the case that a new actual maximum oxygen storage amount CmaxR has just been acquired, or if although a new actual maximum oxygen storage amount CmaxR has just been acquired, a gradient Ka has not been acquired and therefore the value of the learning completion flag XGAKU is "0", the CPU 71 does not execute determination regarding catalyst degradation in the routine, but immediately ends the routine on a temporarily basis.

Figure 23:
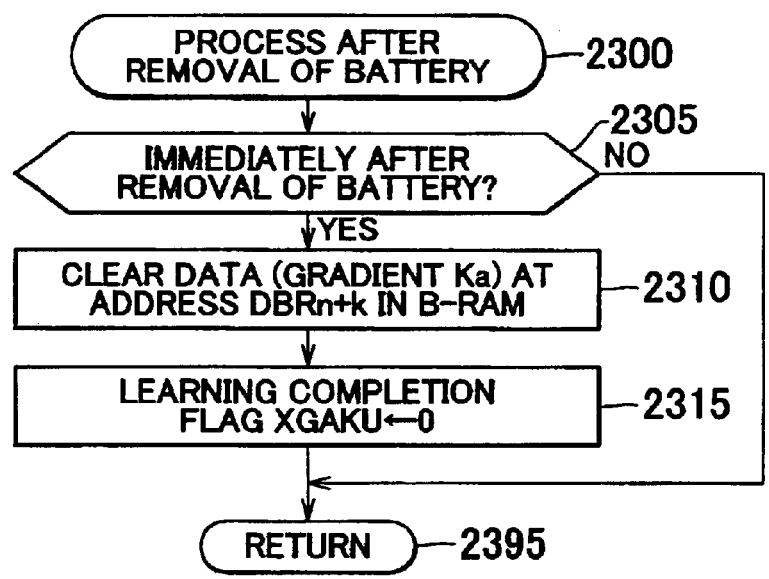
FIG. 23 is a flowchart illustrating a routine for performing an operation after recovery from a discontinuance of power caused by removal of a battery executed by the CPU shown in FIG. 1.

The CPU 71 also cyclically executes a routine of executing a process after removal of a battery illustrated by the flowchart of FIG. 23, at every elapse of a predetermined time. When a predetermined timing arrives, the CPU 71 starts the routine at step 2300, and proceeds to step 2305, in which the CPU 71 determines whether the battery was removed immediately before the present time (whether electric power supply from the battery to the electric control unit 70 has just been restarted). If it is presently not the case that the battery was removed immediately before the present, the CPU 71 makes a determination of "NO" in step 2305, and immediately proceeds to step 2395, in which the CPU 71 temporarily ends the routine.

Conversely, if electric power supply to the electric control unit 70 has just been re-started due to re-connection of the battery after removal thereof, the CPU 71, when proceeding to step 2305, makes a determination of "YES" in step 2305. The CPU 71 then proceeds to step 2310, in which the CPU 71 discards the gradient Ka stored at the address DBRn+k in the backup RAM 74. Subsequently in step 2315, the CPU 71 sets the value of the learning completion flag XGAKU at "0". Subsequently in step 2395, the CPU 71 temporarily ends the routine. Thus, if the reliability of the gradient Ka is lost due to removal of the battery, the gradient Ka is cleared, and a new gradient Ka is learned. Therefore, a false determination regarding catalyst degradation based on false normalization can be avoided.

Figure 24:
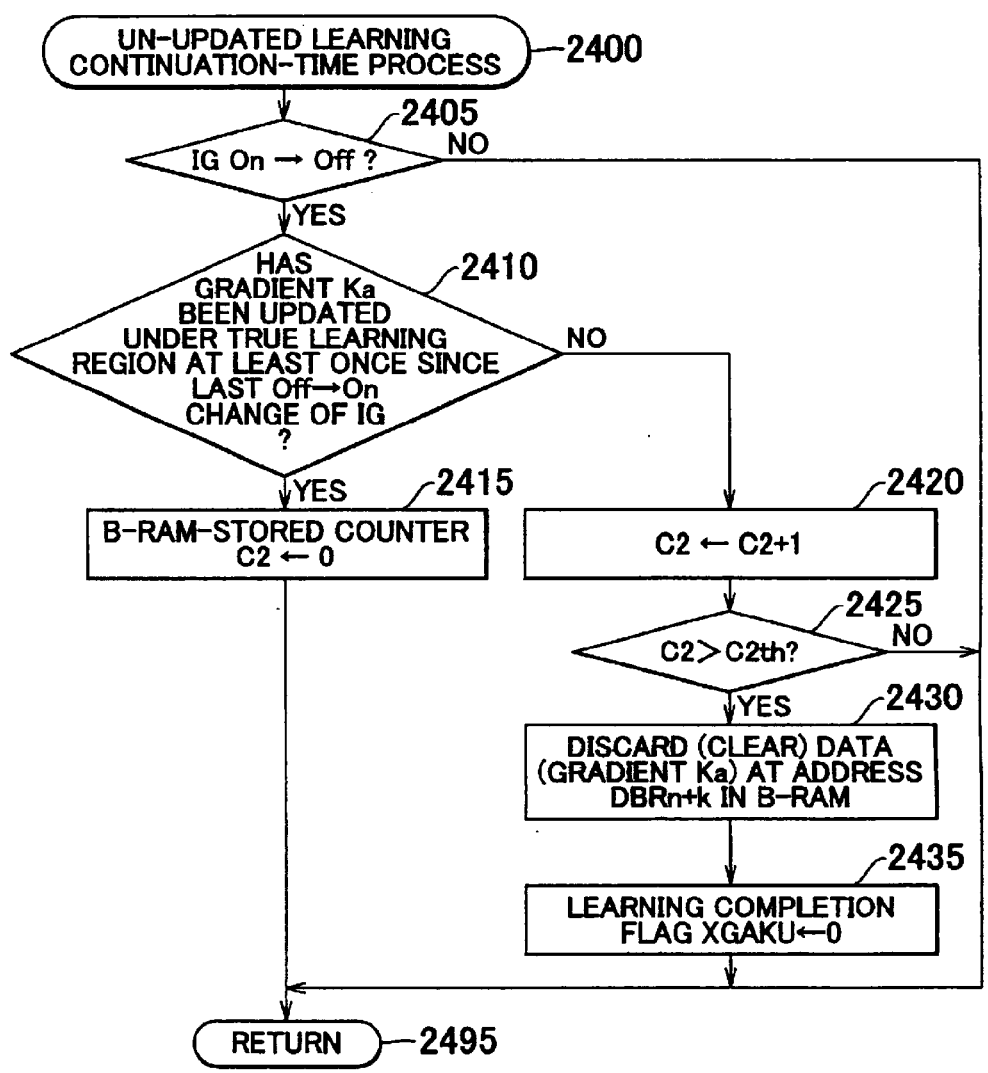
FIG. 24 is a flowchart illustrating a routine for performing an un-updated learning continuation-time operation executed by the CPU shown in FIG. 1.
Figure 25:
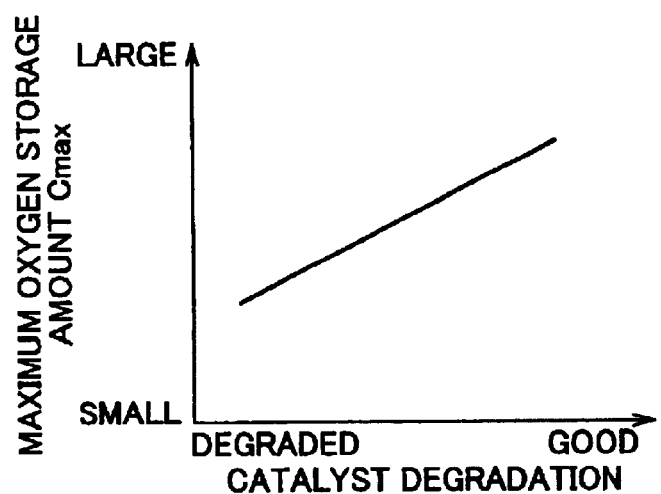
FIG. 25 is a graph indicating a relationship between the degree of degradation and the maximum oxygen storage amount of a catalyst.
Figure 26:
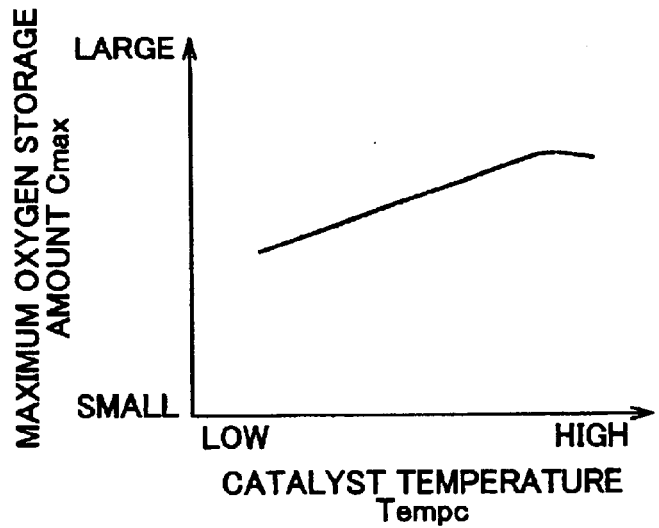
FIG. 26 is a graph indicating a relationship between the temperature and the maximum oxygen storage amount of a catalyst.

The CPU 71 also executes an un-updated learning continuation-time processing routine illustrated by the flowchart of FIG. 24, at every elapse of a predetermined time. When a predetermined timing arrives, the CPU 71 starts the routine at 2400, and proceeds to step 2405, in which the CPU 71 determines whether the ignition switch (not shown) of the vehicle has changed from an on-state to an off-state. If the ignition switch has not been changed from the on-state to the off-state, the CPU 71 makes a determination of "NO" in step 2405, and immediately proceeds to step 2495, in which the CPU 71 temporarily ends the routine.

Conversely, if the ignition switch has just been changed from the on-state to the off-state when the CPU 71 proceeds to step 2405, the CPU 71 makes a determination of "YES" in step 2405, and proceeds to step 2410. In step 2410, the CPU 71 determines whether update of a gradient Ka based on an actual maximum oxygen storage amount CmaxR acquired within the true learning region (region C in FIG. 21) was performed at least once during a period from the beginning of the engine operation that has presently ended (i.e., from the changing of the ignition switch from the off-state to the on-state) to the present time, that is, during the presently ended trip.

If there was no update of a gradient Ka based on an actual maximum oxygen storage amount CmaxR acquired within the true learning region during the presently ended trip, the CPU 71 makes a determination of "YES" in step 2410, and proceeds to step 2415, in which the CPU sets the value of a counter C2 stored in the backup RAM 74 at "0".

Conversely, if the answer to the determination at step 2410 is "NO", that is, if the update of a gradient Ka based on an actual maximum oxygen storage amount CmaxR acquired within the true learning region was not performed at all during the presently ended trip, the CPU 71 makes a determination of "NO" in step 2410, and proceeds to step 2420. In step 2420, the CPU 71 increments the value of the counter C2 by "1". Subsequently in step 2425, the CPU 71 determines whether the value of the counter C2 is greater than a threshold value C2th. If the value of the counter C2 is not greater than the threshold value C2th, the CPU 71 makes a determination of "NO" in step 2425, and proceeds to step 2495, in which the CPU temporarily ends the routine.

As can be understood from the foregoing description, the value of the counter C2 indicates the number of continual trips with no update of a gradient Ka based on an actual maximum oxygen storage amount CmaxR acquired within the true learning region. Therefore, if trips with no update of a gradient Ka based on an actual maximum oxygen storage amount CmaxR acquired within the true learning region continually occurs more than the number of times indicated by the threshold value C2th, the CPU 71 makes a determination of "YES" in step 2425, and proceeds to step 2430. In step 2430, the CPU 71 discards the gradient Ka stored at the address DBRn+k in the backup RAM 74. Subsequently in step 2435, the CPU 71 sets the value of the learning completion flag XGAKU at "0". Subsequently in step 2495, the CPU 71 temporarily ends the routine.

Therefore, if trips with no update of the gradient Ka based on an actual maximum oxygen storage amount CmaxR acquired within the true learning region continually occur more than the number of times indicated by the threshold value C2th, that is, if it becomes highly likely that the value of the gradient Ka has become inappropriate due to progress of catalyst degradation following the last update of the gradient Ka, the CPU 71 suspends normalization of the actual maximum oxygen storage amount CmaxR based on the gradient Ka, and the determination regarding catalyst degradation based on the post-normalization maximum oxygen storage amount Cmaxnorm provided by the normalization. Therefore, the determination regarding catalyst degradation can be performed with increased precision.

As described above, the catalyst degradation determining apparatus (internal combustion engine air-fuel ratio control apparatus) of the invention determines a gradient Ka, that is, a characteristic value of the catalyst, on the basis of an actual maximum oxygen storage amount CmaxR calculated within a region (true learning region) in which there occurs a clear difference in actual maximum oxygen storage amount CmaxR between the degraded catalyst and the un-degraded catalyst, even with a measurement error factored in, and a calculation period catalyst temperature Tave, and corrects an actual maximum oxygen storage amount CmaxR calculated outside the true learning region through the use of the determined gradient Ka so as to convert the actual maximum oxygen storage amount CmaxR into a post-normalization maximum oxygen storage amount Cmaxnorm acquired at a normalization temperature. On the basis of the post-normalization maximum oxygen storage amount Cmaxnorm, the determining apparatus performs determination regarding degradation of the catalyst. Therefore, the precision in determination regarding catalyst degradation can be improved, substantially independently of the catalyst temperature occurring at the time of calculation of the actual maximum oxygen storage amount CmaxR.

Furthermore, the apparatus determines whether the correction performed at the time of acquisition of the post-normalization maximum oxygen storage amount Cmaxnorm is appropriate, that is, whether the gradient Ka, that is, the characteristic value, is appropriate with respect to the present state of the catalyst, on the basis of the correction factor Hoseiritu. If it is determined that the correction is appropriate, the apparatus performs determination regarding catalyst degradation based on the post-normalization maximum oxygen storage amount Cmaxnorm. Therefore, it is possible to avoid an event where a catalyst is determined as an un-degraded catalyst although the catalyst should actually determined as a degraded catalyst. Furthermore, if an actual maximum oxygen storage amount CmaxR is acquired outside the true learning temperature region, the catalyst degradation determination based on the post-normalization maximum oxygen storage amount Cmaxnorm is performed as long as it is determined that the correction is appropriate. Therefore, it is possible to newly obtain a result of determination (confirmation) that the catalyst has not degraded. Hence, the frequency of determination regarding catalyst degradation can be increased in comparison with a case where catalyst degradation determination is performed only on the basis of the actual maximum oxygen storage amount CmaxR calculated within the learning temperature region.

The normalization temperature Tcs is set at a temperature at which the gradient Ka, that is, the characteristic value, reliably becomes equal to a value corresponding to the degree of degradation of the catalyst even if there exists a measurement error regarding the actual maximum oxygen storage amount CmaxR. Therefore, the post-normalization maximum oxygen storage amount Cmaxnorm of a degraded catalyst is never equal to the post-normalization maximum oxygen storage amount Cmaxnorm of an un-degraded catalyst. As a result, the precision in determination regarding catalyst degradation can be further improved.

The invention is not limited to the foregoing embodiment. On the contrary, various modifications are included within the scope of the invention. For example, although in the foregoing embodiment, the actual maximum oxygen storage amount CmaxR is normalized on the basis of the calculation period catalyst temperature Tave and mathematical expression 5, it is also possible to adopt a construction in which on the basis of a different factor that affects the magnitude of the actual maximum oxygen storage amount CmaxR (e.g., the calculation period intake air flow Gaave and/or the deviation AbyF of the air-fuel ratio of a gas that flows into the catalyst during the calculation period from the stoichiometric air-fuel ratio), the actual maximum oxygen storage amount CmaxR is corrected, and converted and normalized into a maximum oxygen storage amount Cmax obtained under a predetermined normalization air flow Gcs and/or a predetermined air-fuel ratio deviation AbyFcs, and the determination regarding catalyst degradation is performed on the basis of the post-normalization maximum oxygen storage amount Cmaxnorm obtained by the normalization.

Furthermore, although in the foregoing embodiment a value obtained through normalization of a maximum oxygen storage amount Cmax is used for determination regarding catalyst degradation, it is possible to use a different index value (degradation index value) that changes in accordance with the degree of catalyst degradation, for example, a ratio (locus ratio) between the length of a locus formed by the output of the downstream-side air-fuel ratio sensor and the length of a locus formed by the output of the upstream-side air-fuel ratio sensor 66 during a period during which the air-fuel ratio of gas flowing into the first catalyst 53 is feedback-controlled to the stoichiometric air-fuel ratio, a ratio (lean-rich switch ratio) between the frequency of the passing of the output of the downstream-side air-fuel ratio sensor across the stoichiometric air-fuel ratio-equivalent value and the frequency of the passing of the output of the upstream-side air-fuel ratio sensor 66 across the stoichiometric air-fuel ratio-equivalent value during a period during which the air-fuel ratio of gas flowing into the first catalyst 53 is feedback-controlled to the stoichiometric air-fuel ratio, a ratio (area ratio) between the area formed between a locus formed by the output of the downstream-side air-fuel ratio sensor and the stoichiometric air-fuel ratio-equivalent value and the area formed between a locus formed by the output of the upstream-side air-fuel ratio sensor 66 and the stoichiometric air-fuel ratio-equivalent value during a period during which the air-fuel ratio of gas flowing into the first catalyst 53 is feedback-controlled to the stoichiometric air-fuel ratio, etc. In this construction, the index value is normalized and corrected through the use of a factor that affects the index value so as to determine a post-normalization degradation index value, and determination regarding catalyst degradation is performed by comparing the post-normalization degradation index value with a catalyst degradation criterion value.

Still further, in step 2235 in FIG. 22, determination regarding catalyst degradation is performed on the basis of the post-normalization maximum oxygen storage amount Cmaxnorm obtained by normalizing a single actual maximum oxygen storage amount CmaxR. However, if a gradient Ka has been obtained and the correction factor Hoseiritu is less than the threshold value Hth, it is possible to perform determination regarding catalyst degradation as follows. That is, every time an actual maximum oxygen storage amount CmaxR is calculated, the actual maximum oxygen storage amount CmaxR is normalized, and the thus-obtained post-normalization maximum oxygen storage amount Cmaxnorm is stored in the backup RAM 74 in a sequence. When a new post-normalization maximum oxygen storage amount Cmaxnorm is obtained, the determination regarding catalyst degradation is performed by comparing a simple average value of the new post-normalization maximum oxygen storage amount Cmaxnorm and the post-normalization maximum oxygen storage amounts Cmaxnorm already stored in the backup RAM 74 or a weighted average value thereof with an increased weight put on the new post-normalization maximum oxygen storage amount Cmaxnorm with a catalyst degradation criterion value.

Still further, although in step 2220 in FIG. 22, appropriateness of the correction is determined on the basis of the correction factor Hoseiritu, that is, the ratio of the amount of correction to the newly calculated actual maximum oxygen storage amount CmaxR used for computation of the post-normalization maximum oxygen storage amount, it is also possible to determine whether the correction is appropriate on the basis of the ratio (=Ka/CmaxR) of the determined gradient Ka to the newly calculated actual maximum oxygen storage amount CmaxR.

The above-described subsidiary feedback control may be a PID control instead of the PI control. Furthermore, the downstream-side air-fuel ratio sensor 67 may be of the same type as the upstream-side air-fuel ratio sensor 66.

In the foregoing embodiment, when an actual maximum oxygen storage amount CmaxR is to be determined, the engine air-fuel ratio is sequentially controlled to the set lean air-fuel ratio abyfLean, the set rich air-fuel ratio abyfRich, and the set lean air-fuel ratio abyfLean. An average value of the maximum oxygen storage amount Cmax2 acquired during the period (the second mode) during which the target air-fuel ratio is the set rich air-fuel ratio abyfRich and the maximum oxygen storage amount Cmax3 acquired during the period (the third mode following the second mode) during which the target air-fuel ratio is the set lean air-fuel ratio abyfLean is acquired as data regarding a maximum oxygen storage amount Cmax. However, it is also possible to adopt a construction in which the second mode and the third mode are alternately repeated a plurality of times (e.g., four times), and the maximum oxygen storage amounts Cmax acquired during each mode are averaged so as to provide data regarding an actual maximum oxygen storage amount CmaxR at that time point.

Furthermore, if the downstream-side air-fuel ratio sensor output Voxs indicates a rich air-fuel ratio at the time of fulfillment of the oxygen storage amount calculating condition, the control may be started in the second mode, during which the upstream-of-first catalyst air-fuel ratio is set at the set rich air-fuel ratio. It should be noted herein that the maximum oxygen storage amount Cmax2 estimated during the initial second mode is not accurate, and is therefore discarded. The initial second mode is followed by the third mode and then the second mode. An average value of the maximum oxygen storage amount Cmax3 and the maximum oxygen storage amount Cmax2 acquired during the third mode and the second mode is adopted as an actual maximum oxygen storage amount CmaxR.

Figure 21:
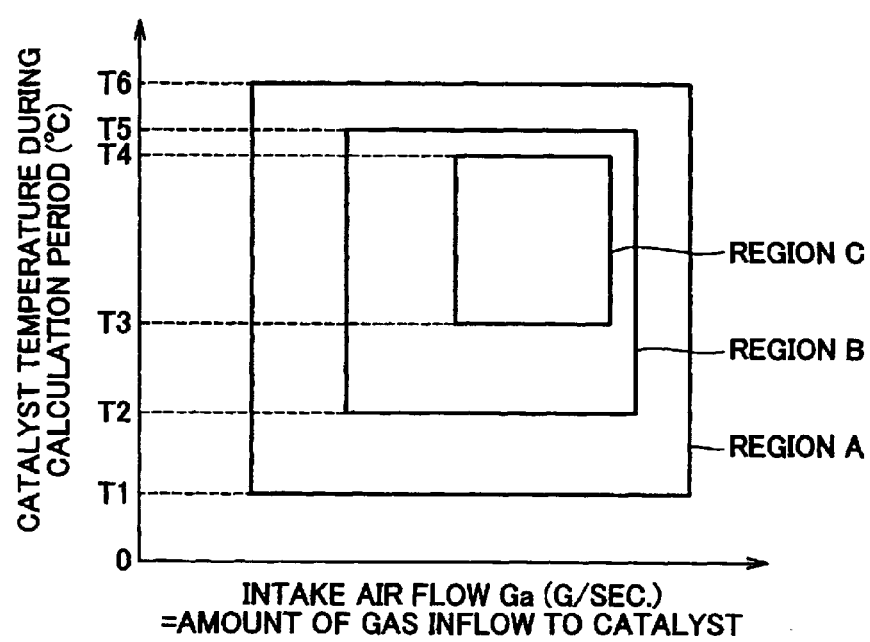
FIG. 21 is a diagram indicating operation regions for calculation of the maximum oxygen storage amount and the characteristic value of the catalyst (gradient)

Furthermore, although in the foregoing embodiment, the data acquisition region (region A), the provisional learning region (region B) and the true learning region (region C) are defined by two variables, that is, the calculation period catalyst temperature and the calculation period intake air flow as indicated in FIG. 21, each region may instead be defined only by the calculation period catalyst temperature. That is, the temperature region of T1 to T6, the temperature region of T2 to T5, and the temperature region of T3 to T4 (T1<T2<T3<T4<T5<T6) may be set as a data acquisition region (normal operation region), a provisional learning region, and a true learning region, respectively.

What is claimed is:

1. A catalyst degradation determining apparatus that determines whether a catalyst provided in an exhaust passage of an internal combustion engine has degraded, comprising a controller, wherein the controller acquires a degradation index value that changes in accordance with a degree of degradation of the catalyst, the controller corrects the degradation index value acquired, based on a factor that affects the degradation index value, so that the degradation index value becomes equal to a post-normalization index value that is a degradation index value acquired when the factor is a predetermined value; and the controller determines whether the catalyst has degraded, based on a result of comparison regarding whether the post-normalization index value is greater than a catalyst degradation criterion value.

2. The catalyst degradation determining apparatus according to claim 1, wherein the degradation index value that changes in accordance with the degree of degradation of the catalyst is a maximum oxygen storage amount of the catalyst.

3. The catalyst degradation determining apparatus according to claim 2, wherein the factor is a temperature of the catalyst.

4. A catalyst degradation determining apparatus that determines whether a catalyst provided in an exhaust passage of an internal combustion engine has degraded, comprising:

a controller; and a data storage, wherein the controller calculates a maximum oxygen storage amount of the catalyst;

the controller acquires a calculation period catalyst temperature that is a temperature of the catalyst during a period during which the maximum oxygen storage amount is calculated;

the data storage pre-stores relationships between the temperature of the catalyst and the maximum oxygen storage amount of the catalyst separately for individual degrees of degradation of the catalyst, and pre-stores a characteristic value that specifies the degrees of degradation corresponding to the relationships;

if a maximum oxygen storage amount is calculated and the calculation period catalyst temperature during the period of calculation of the maximum oxygen storage amount is within a predetermined temperature range, the controller determines the characteristic value of the catalyst occurring at a time point of calculation of the maximum oxygen storage amount based on the maximum oxygen storage amount and the calculation period catalyst temperature as well as the relationships and the characteristic value stored in the data storage;

if a maximum oxygen storage amount is newly calculated and the calculation period catalyst temperature during the period of calculation of the maximum oxygen storage amount newly calculated is not within the predetermined temperature range, the controller corrects the newly calculated maximum oxygen storage amount by normalizing the same amount so as to reach a post-normalization maximum oxygen storage amount that is a maximum oxygen storage amount when the catalyst has a predetermined normalization temperature, based on the characteristic value determined, the normalization temperature, and the calculation period catalyst temperature of the calculation period of the newly calculated maximum oxygen storage amount;

the controller determines whether the correction of the newly calculated maximum oxygen storage amount is appropriate; and the controller determines whether the catalyst has degraded based on a result of determination as to whether the post-normalization maximum oxygen storage amount is greater than a catalyst degradation criterion value, when it is determined that the correction of the newly calculated maximum oxygen storage amount is appropriate.

5. The catalyst degradation determining apparatus according to claim 4, wherein the characteristic value stored in the data storage is a gradient of a linear expression of a relationship between the temperature of the catalyst and the maximum oxygen storage amount of the catalyst.

6. The catalyst degradation determining apparatus according to claim 4, wherein the predetermined temperature range is set as a range in which the maximum oxygen storage amount of the catalyst when the catalyst is to be determined as a degraded catalyst is always different from the maximum oxygen storage amount of the catalyst when the catalyst is to be determined as an un-degraded catalyst even if the maximum oxygen storage amount of the catalyst calculated within the temperature range varies due to a measurement error, and the normalization temperature is set at a temperature within the predetermined temperature range.

7. The catalyst degradation determining apparatus according to claim 6, wherein the characteristic value stored in the data storage is a gradient of a linear expression of a relationship between the temperature of the catalyst and the maximum oxygen storage amount of the catalyst.

8. The catalyst degradation determining apparatus according to claim 7, wherein the controller is designed so as to determine a correction amount by multiplying a difference between the calculation period catalyst temperature during the period of calculation of the newly calculated maximum oxygen storage amount and the normalization temperature by the gradient of the linear expression that is the determined characteristic value, and determine the post-normalization maximum oxygen storage amount by correcting the newly calculated maximum oxygen storage amount with the correction amount; and the controller is designed so as to determine whether the correction is appropriate based on a ratio of the correction amount to the newly calculated maximum oxygen storage amount used in determining the post-normalization maximum oxygen storage amount, or a ratio of the determined gradient to the newly calculated maximum oxygen storage amount.

9. A catalyst degradation determining method for determining whether a catalyst provided in an exhaust passage of an internal combustion engine has degraded, wherein a degradation index value that changes in accordance with a degree of degradation of the catalyst is acquired;

the degradation index value acquired is corrected based on a factor that affects the degradation index value so that the degradation index value becomes equal to a post-normalization index value that is a degradation index value acquired when the factor is a predetermined value; and whether the catalyst has degraded is determined based on a result of comparison regarding whether the post-normalization index value is greater than a catalyst degradation criterion value.

10. The catalyst degradation determining method according to claim 9, wherein the degradation index value that changes in accordance with the degree of degradation of the catalyst is a maximum oxygen storage amount of the catalyst.

11. The catalyst degradation determining method according to claim 10, wherein the factor is a temperature of the catalyst.

12. A catalyst degradation determining method for determining whether a catalyst provided in an exhaust passage of an internal combustion engine has degraded, wherein a maximum oxygen storage amount of the catalyst is calculated;

a calculation period catalyst temperature is calculated, which is a temperature of the catalyst during a period during which the maximum oxygen storage amount is calculated;

relationships between the temperature of the catalyst and the maximum oxygen storage amount of the catalyst are pre-stored separately for individual degrees of degradation of the catalyst, and a characteristic value that specifies the degrees of degradation corresponding to the relationships is pre-stored;

if a maximum oxygen storage amount is calculated and the calculation period catalyst temperature during the period of calculation of the maximum oxygen storage amount is within a predetermined temperature range, the characteristic value of the catalyst occurring at a time point of calculation of the maximum oxygen storage amount is determined based on the maximum oxygen storage amount and the calculation period catalyst temperature as well as the relationships and characteristic value stored;

if a maximum oxygen storage amount is newly calculated and the calculation period catalyst temperature during the period of calculation of the maximum oxygen storage amount newly calculated is not within the predetermined temperature range, the newly calculated maximum oxygen storage amount is corrected by being normalized so as to reach a post-normalization maximum oxygen storage amount that is a maximum oxygen storage amount when the catalyst has a predetermined normalization temperature, based on the characteristic value determined, the normalization temperature, and the calculation period catalyst temperature of the calculation period of the newly calculated maximum oxygen storage amount;

whether the correction of the newly calculated maximum oxygen storage amount is appropriate is determined; and whether the catalyst has degraded is determined based on a result of determination as to whether the post-normalization maximum oxygen storage amount is greater than a catalyst degradation criterion value, when it is determined that the correction of the newly calculated maximum oxygen storage amount is appropriate.

* * * * *